US010673652B2

(12) United States Patent
Stirling-Gallacher et al.

(10) Patent No.: US 10,673,652 B2
(45) Date of Patent: *Jun. 2, 2020

(54) SYSTEM AND METHOD FOR PROVIDING EXPLICIT FEEDBACK IN THE UPLINK

(71) Applicant: Futurewei Technologies, Inc., Plano, TX (US)

(72) Inventors: Richard Stirling-Gallacher, San Diego, CA (US); Bin Liu, San Diego, CA (US); Pengfei Xia, San Diego, CA (US); Nathan Edward Tenny, Poway, CA (US); Hongcheng Zhuang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,102

(22) Filed: Mar. 2, 2017

(65) Prior Publication Data

US 2018/0254922 A1 Sep. 6, 2018

(51) Int. Cl.
*H04L 25/02* (2006.01)
*H04L 5/00* (2006.01)

(52) U.S. Cl.
CPC ........ *H04L 25/0202* (2013.01); *H04L 5/0048* (2013.01); *H04L 5/0007* (2013.01)

(58) Field of Classification Search
CPC ...... H04B 7/0417; H04B 7/043; H04B 7/063; H04B 7/0695
See application file for complete search history.

(56) References Cited

U.S. PATENT DOCUMENTS

| 7,447,270 | B1 * | 11/2008 | Hottinen | H04B 7/0634 |
| | | | | 375/141 |
| 9,237,475 | B2 * | 1/2016 | Josiam | H04W 24/10 |
| 9,385,853 | B2 | 7/2016 | Zhou et al. | |
| 9,686,038 | B2 * | 6/2017 | Shapira | H04K 3/825 |
| 2007/0042720 | A1 | 2/2007 | Pan et al. | |

(Continued)

FOREIGN PATENT DOCUMENTS

| CN | 1893308 A | 1/2007 |
| CN | 105210306 A | 12/2015 |
| WO | 2016134532 A1 | 9/2016 |

OTHER PUBLICATIONS

"Discussion and evaluation of analog CSI feedback," 3GPP TSG RAN WG1 Meeting #85, R1-164097, Nanjing, China, May 23-27, 2016, 6 pages.

(Continued)

*Primary Examiner* — Asad M Nawaz
*Assistant Examiner* — Berhanu D Belete
(74) *Attorney, Agent, or Firm* — Slater Matsil, LLP

(57) ABSTRACT

A method for transmitting feedback includes generating explicit channel feedback for a plurality of transmit beam-receive beam combinations (TRBCs) between the user device and a transmit-receive point (TRP), generating a modified resource in accordance with explicit feedback configuration information, the modified resource configured to convey the explicit channel feedback, wherein an explicit channel feedback associated with each TRBC is conveyed on a different data symbol of the modified resource, and transmitting the modified resource to the TRP using a single TRBC.

28 Claims, 13 Drawing Sheets

(56) References Cited

U.S. PATENT DOCUMENTS

| | | | |
|---|---|---|---|
| 2010/0238824 A1* | 9/2010 | Farajidana | H04B 7/0417 370/252 |
| 2011/0080971 A1* | 4/2011 | Clerckx | H04B 7/0626 375/267 |
| 2011/0085460 A1* | 4/2011 | Zhang | H04W 56/005 370/252 |
| 2011/0237282 A1* | 9/2011 | Geirhofer | H04B 7/024 455/509 |
| 2012/0214404 A1* | 8/2012 | Shany | H04K 3/43 455/1 |
| 2012/0314679 A1* | 12/2012 | Lee | H04L 5/0053 370/329 |
| 2012/0315938 A1* | 12/2012 | Van Nee | H04B 7/0434 455/507 |
| 2013/0114455 A1* | 5/2013 | Yoo | H04W 72/082 370/252 |
| 2013/0155847 A1 | 6/2013 | Li et al. | |
| 2013/0182683 A1* | 7/2013 | Seol | H04W 72/046 370/335 |
| 2013/0223392 A1* | 8/2013 | Seo | H04L 1/0026 370/329 |
| 2013/0235742 A1 | 9/2013 | Josiam et al. | |
| 2013/0235911 A1* | 9/2013 | Geirhofer | H04B 7/0417 375/219 |
| 2013/0286940 A1* | 10/2013 | To | H04B 7/0417 370/328 |
| 2013/0303180 A1* | 11/2013 | Wang | H04B 7/024 455/450 |
| 2013/0336112 A1* | 12/2013 | Liu | H04W 28/0289 370/230 |
| 2014/0022924 A1 | 1/2014 | Cili | |
| 2014/0050181 A1* | 2/2014 | Tiirola | H04L 5/0035 370/329 |
| 2014/0093005 A1* | 4/2014 | Xia | H04B 7/0617 375/267 |
| 2014/0119278 A1* | 5/2014 | Balraj | H04B 7/0456 370/328 |
| 2014/0192918 A1* | 7/2014 | Park | H04B 7/0486 375/267 |
| 2014/0241242 A1 | 8/2014 | Josiam et al. | |
| 2014/0307654 A1 | 10/2014 | Kim | |
| 2014/0328266 A1* | 11/2014 | Yu | H04L 5/0053 370/329 |
| 2014/0334566 A1* | 11/2014 | Kim | H04B 7/0469 375/267 |
| 2015/0009951 A1 | 1/2015 | Josiam et al. | |
| 2015/0016379 A1* | 1/2015 | Nam | H04B 7/0456 370/329 |
| 2015/0110210 A1 | 4/2015 | Yang et al. | |
| 2015/0124738 A1* | 5/2015 | Ramakrishna | H04L 5/0048 370/329 |
| 2015/0139101 A1* | 5/2015 | Guo | H04L 5/0035 370/329 |
| 2015/0188662 A1* | 7/2015 | Shapira | H04K 3/825 455/1 |
| 2015/0244432 A1* | 8/2015 | Wang | H04B 7/0695 375/267 |
| 2016/0204921 A1* | 7/2016 | Kim | H04L 12/189 370/312 |
| 2016/0241322 A1* | 8/2016 | Son | H04B 7/0617 |
| 2017/0034733 A1* | 2/2017 | Sun | H04B 7/0617 |
| 2017/0127398 A1* | 5/2017 | Andgart | H04B 7/0695 |
| 2017/0208494 A1 | 7/2017 | Moon et al. | |
| 2017/0215117 A1* | 7/2017 | Kwon | H04B 7/04 |
| 2017/0353227 A1 | 12/2017 | Liu et al. | |
| 2018/0019795 A1* | 1/2018 | Zhang | H04B 7/0632 |
| 2018/0027585 A1* | 1/2018 | Guo | H04W 16/28 370/336 |
| 2018/0034612 A1* | 2/2018 | Lin | H04L 5/0048 |
| 2018/0062724 A1* | 3/2018 | Onggosanusi | H04B 7/0478 |
| 2018/0063883 A1* | 3/2018 | Nagaraja | H04W 76/048 |
| 2018/0124819 A1* | 5/2018 | Kwon | H04W 72/044 |
| 2018/0167116 A1* | 6/2018 | Rahman | H04B 7/04 |
| 2018/0184409 A1* | 6/2018 | Min | H04L 5/0007 |
| 2018/0278315 A1* | 9/2018 | Wu | H04B 7/0626 |

OTHER PUBLICATIONS

"Advanced CSI feedback framework for LTE," 3GPP TSG RAN WG1 Meeting #85, R1-164856, Nanjing, China, May 23-27, 2016, 6 pages.

Zhu, et al., "Analog Feedback for MIMO-OFDM Systems," 2013 IEEE Wireless Communications and Networking Conference (WCNC): PHY, Apr. 7-10, 2013, pp. 3046-3050.

Zte et al., "Discussion on Measurements and RS Design for CLI Mitigation", 3GPP TSG RAN WG1 Meeting #88, R1-1701615 Feb. 13-17, 2017, 13 Pages, Athens, Greece.

Huawei et al., "Considerations on two-level configuration of CSI acquisition settings", 3GPP TSG RAN WG1 Meeting #88, R1-1701682, Feb. 13-17, 2017, 5 pages, Athens, Greece.

Huawei et al., "CSI Acquisition Framework", 3GPP TSG RAN WG1 Meeting #88bis, R1-1704226, Apr. 3-7, 2017, 8 pages, Spokane, USA.

* cited by examiner

BETTER CHOICE IS T5 AND T6 FOR U2 (BUT FORCED TO USE T4 AND T5)

US 10,673,652 B2

SYSTEM AND METHOD FOR PROVIDING EXPLICIT FEEDBACK IN THE UPLINK

TECHNICAL FIELD

The present disclosure relates generally to a system and method for digital communications, and, in particular embodiments, to a system and method for explicit feedback in the uplink.

BACKGROUND

Many modern cellular communications systems (i.e., Third Generation Partnership Project (3GPP) Long Term Evolution Advanced (LTE-A) compliant communications systems) use uplink sounding, commonly referred to as sounding reference signals (SRS), from a user equipment (UE) to an access node to allow the access point to obtain an estimate of the uplink channel between the UE and the access node. Uplink sounding is often used in time division duplexed (TDD) communications systems that allow the access node to use channel reciprocity to obtain estimates of a downlink channel between the access node and the UE from the estimated uplink channel.

In communications systems that are link-budget limited (such as communications systems operating above 6 GHz, e.g., millimeter wave (mmWave) communications systems) the reference signals would need to be beamformed (at a transmitting device and a receiving device) to meet performance requirements in an operating environment with high path-loss. Therefore, a UE would have to transmit a large number of SRS symbols in order to facilitate channel estimation between each transmit antenna (or port) and each receive antenna at each access node. The transmissions of the large numbers of SRS would significantly impact overall communications system performance by consuming a large amount of beamformed uplink resources as overhead. This problem is especially a problem in configurations with limited uplink resources.

SUMMARY

Example embodiments provide a system and method for explicit feedback in the uplink.

In accordance with an example embodiment, a method for transmitting feedback is provided. The method includes generating, by a user device, explicit channel feedback for a plurality of transmit beam-receive beam combinations (TRBCs) between the user device and a transmit-receive point (TRP), generating, by the user device, a modified resource in accordance with explicit feedback configuration information, the modified resource configured to convey the explicit channel feedback, wherein an explicit channel feedback associated with each TRBC is conveyed on a different data symbol of the modified resource, and transmitting, by the user device, the modified resource to the TRP using a single TRBC.

When the modified resource is a modified sounding reference signal (SRS) resource, the explicit channel feedback associated with each TRBC is conveyed on a subset of subcarriers of a data symbol associated with the TRBC. When the modified resource is a modified uplink physical resource block (PRB) resource, the explicit channel feedback associated with each TRBC is conveyed on a data symbol associated with the TRBC. When the user device comprises a plurality of radio frequency (RF) chains, the generating the modified resource includes placing explicit channel feedbacks associated with each RF chain on different subsets of subcarriers of the different data symbols of the modified resource. The single TRBC is a TRBC with a highest channel quality from the plurality of TRBCs.

The method also includes receiving the explicit feedback configuration information indicating at least a number of receive communications beams at the user device for which the user device is to generate explicit channel feedback. The explicit feedback configuration information further indicates one of a first set of transmit communications beams of the TRP for which the user device is able to selectively generate explicit channel feedback and a second set of transmit communications beams of the TRP from which the user device must generate channel feedback. The method further includes transmitting, by the user device, an indicator of one or more transmit communications beams of the TRP selected by the user device when the explicit feedback configuration information further indicates a first set of transmit communications beams of the TRP from which the user device is able to selectively generate channel feedback.

In accordance with an example embodiment, a method for operating a TRP is provided. The method includes receiving, by the TRP, a modified resource over a single TRBC, the modified resource conveying explicit channel feedback associated with a plurality of TRBCs between the TRP and a user device, and communicating, by the TRP, with the user device in accordance with the explicit channel feedback.

The method also includes transmitting, by the TRP, explicit feedback configuration information indicating at least a number of receive communications beams of the user device for which the user device is to generate explicit channel feedback. The single TRBC is a TRBC with a highest channel quality from the plurality of TRBCs.

The explicit feedback configuration information further indicates one of a first set of transmit communications beams of the TRP from which the user device is able to selectively generate explicit channel feedback and a second set of transmit communications beams of the TRP from which the user device must generate explicit channel feedback.

The method also includes receiving, by the TRP, an indicator of transmit communications beams of the TRP selected by the user device when the explicit feedback configuration information further indicates a first set of transmit communications beams of the TRP from which the user device is able to selectively generate explicit channel feedback.

In accordance with an example embodiment, a user device adapted to transmit feedback is provided. The user device includes a processor, and a computer readable storage medium storing programming for execution by the processor. The programming including instructions to configure the user device to generate explicit channel feedback for a plurality of TRBCs between the user device and a TRP, generate a modified resource in accordance with explicit feedback configuration information, the modified resource configured to convey the explicit channel feedback, wherein an explicit channel feedback associated with each TRBC is conveyed on a different data symbol of the modified resource, and transmit the modified resource to the TRP using a single TRBC.

The modified resource is a modified SRS resource, and the explicit channel feedback associated with each TRBC is conveyed on a subset of subcarriers of a data symbol associated with the TRBC. The modified resource is a modified uplink PRB, and the explicit channel feedback associated with each TRBC is conveyed on a data symbol associated with the TRBC.

When the user device includes a plurality of radio frequency (RF) chains, the programming includes instructions to configure the user device to place explicit channel feedback associated with each RF chain on different subsets of subcarriers of the different data symbols of the modified resource. The programming includes instructions to configure the user device to receive the explicit feedback configuration information indicating at least a number of receive communications beams at the user device for which the user device is to generate explicit channel feedback. When the explicit feedback configuration information further indicates a first set of transmit communications beams of the TRP from which the user device is able to selectively generate explicit channel feedback, the programming includes instructions to configure the user device to transmit an indicator of one or more transmit communications beams of the TRP selected by the user device.

In accordance with an example embodiment, a TRP is provided. The TRP includes a processor, and a computer readable storage medium storing programming for execution by the processor. The programming including instructions to configure the TRP to receive a modified resource over a single TRBC, the modified resource conveying explicit channel feedback associated with a plurality of TRBCs between the TRP and a user device, and communicate with the user device in accordance with the explicit channel feedback.

The programming includes instructions to configure the TRP to transmit explicit feedback configuration information indicating at least a number of receive communications beams of the user device for which the user device is to generate explicit channel feedback.

When the explicit feedback configuration information further indicates a first set of transmit communications beams of the TRP from which the user device is able to selectively generate explicit channel feedback, the programming includes instructions to configure the TRP to receive an indicator of transmit communications beams of the TRP selected by the user device.

Practice of the foregoing embodiments enables the transmission of the combination of downlink channel responses from the access node to the UE using the best uplink beam combination. This results in improved performance because: the downlink channel responses are transmitted with the best signal to noise ratio (SNR) available; reduced latency due to elimination of the need to switch between transmission beams at the UE; and the UE does not have to switch radio frequency (RF) circuits, if the number of receiving and transmitting chains on the UE are different.

Practice of the foregoing embodiments enables the combination of explicit feedback with beamforming, resulting in a solution with improved channel estimation performance and reduced latency.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
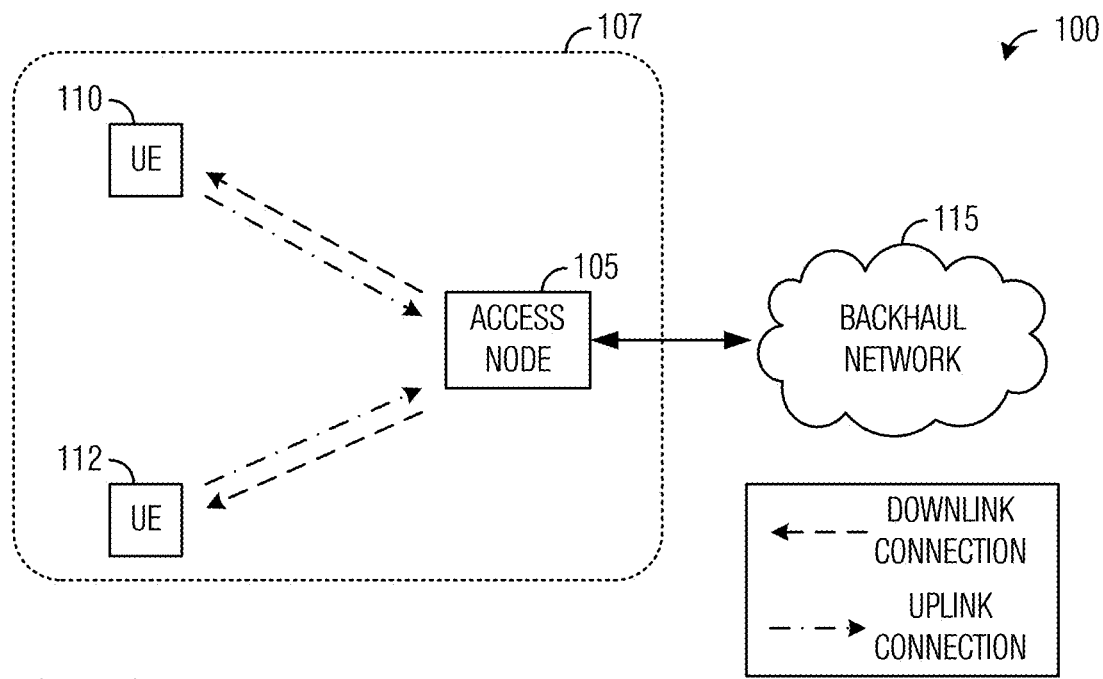
FIG. 1 illustrates an example wireless communications system according to example embodiments described herein.

FIG. 1 illustrates an example wireless communications system 100. Communications system 100 includes an access node 105 with a coverage area 107. Access node 105 serves a plurality of user equipments (UEs), including UE no and UE 112. As shown in FIG. 1, Access node 105 establishes downlink (dashed lines) and uplink (dashed dotted lines) connections with the UEs. The downlink connections carry data from access node 105 to the UEs and the uplink connections carry data from the UEs to access node 105. Data carried over the downlink/uplink connections may include data communicated between the UEs and services (not shown) by way of a backhaul network 115. Wireless access may be provided in accordance with one or more wireless communications protocols, e.g., the Third Generation Partnership Project (3GPP) Long Term Evolution (LTE), LTE Advanced (LTE-A), high speed packet access (HSPA), IEEE 802.11, and so on. While it is understood that communications systems may employ multiple access nodes capable of communicating with a number of UEs, only one access node, and two UEs are illustrated for simplicity.

Access nodes may refer to evolved NodeBs (eNBs), base stations, NodeBs, master eNBs (MeNBs), secondary eNBs (SeNBs), remote radio heads, access points, while UEs may refer to mobiles, mobile stations, terminals, subscribers, users, and the like. A transmission point (TP) may be considered to be a device sending a transmission, and a reception point (RP) may be considered to be a device receiving the transmission. A single device may be both a transmission point and a reception point for different transmissions; such a device is referred to as a transmit-receive point (TRP). Access nodes may be TRPs. In some situations, UEs may also be TRPs.

In 3GPP LTE communications systems, UEs transmit sounding reference signals (SRSs) to the TRPs so that the TRPs may estimate the complex channel response of the uplink channels and then by utilizing the channel reciprocity relationship an estimate of the complex channel response of the downlink channel can be determined. The estimated channel responses may be used to determine communications beams at the TRP with which to transmit downlink transmissions to the UEs and/or to receive uplink transmissions from the UEs. As used herein, the term communications beam refers to a set of beamforming weights (e.g., amplitude and/or phase shifts for antenna elements of an antenna array) that are used for directional signal and/or reception.

Unlike in 3GPP LTE communications systems, beamforming in millimeter wave (mmWave) communications systems may generally be performed by both the TRPs and the UEs in order to achieve commercially acceptable levels of throughput and range over the higher carrier frequencies. Accordingly, SRS transmission schemes for mmWave communications systems may need to identify communications beams to be used by both the UEs and the TRPs to reduce SRS sounding overhead.

A beam may be a pre-defined set of beamforming weights in the context of codebook-based precoding or a dynamically defined set of beamforming weights in the context of non-codebook based precoding (e.g., Eigen-based beamforming (EBB)). It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

Simply sounding in every possible transmit-receive communications beam combination would result in too much SRS sounding overhead, negatively impacting communications performance and efficiency. According to the simple SRS sounding technique, a UE performs SRS transmissions according to different transmit beam directions from a set of transmit beam directions available to the UE, and the TRP receives the beamformed SRS transmissions from the UE according to different receive beam directions from a set of receive beam directions available to the TRP. The TRP estimates the complex channel responses for the uplink channels based on the received SRS transmissions and determines the estimates for the corresponding downlink channels. The estimates may be used to determine which communications beams the TRP uses to transmit downlink signals as well as which beam directions the UE uses to receive the downlink signals.

It is noted that the channel in mmWave communications systems are spatially sparse and that only a few spatial directions are significant. Due to the high path loss, mmWave communications beams are easily blocked and reflected signals are subject to high reflection losses (on the order of 10-25 dB) as well as extra path loss to reach the receiver. Therefore, in most situations only communications beams that are directly (or substantially directly) oriented towards a device have adequately high signal to noise ratios (SNRs) to support good throughput. However, situations exist where the communications beams that are directly oriented towards a device are blocked. In such situations, beams that are not directly oriented, but are substantially directly oriented towards the device may have the best SNRs. The communications beams with adequately high SNRs are referred to as significant communications beams.

Figure 2:
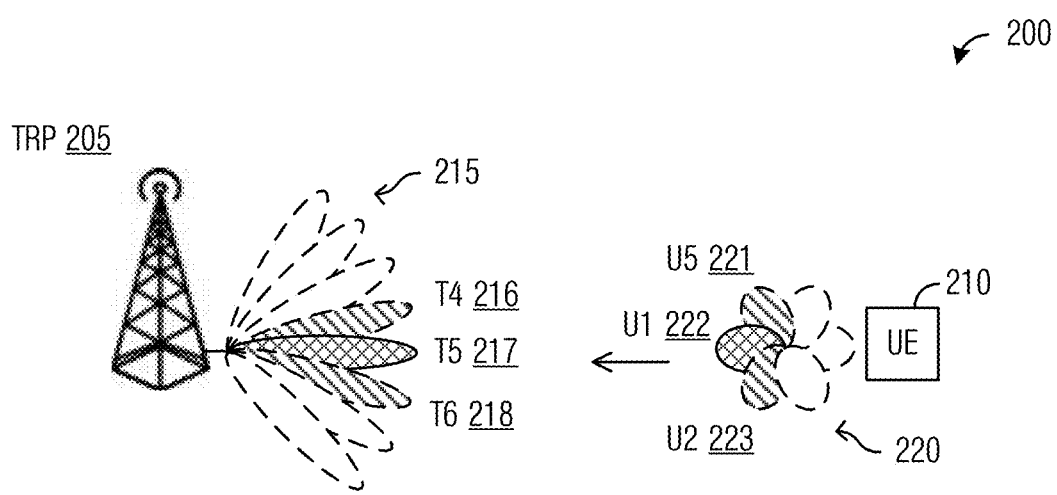
FIG. 2 illustrates an example communications system highlighting significant communications beams.

FIG. 2 illustrates an example communications system 200 highlighting significant communications beams. Communications system 200 includes a TRP 205 serving a UE 210. TRP 205 may perform beamformed communications using a set of communications beams 215 (a portion of which is shown in FIG. 2). Similarly, UE 210 communicates using a set of communications beams 220. Although there are many available communications beams in set of communications beams 215 and set of communications beams 220, due to the high path loss nature of mmWave channels, only a subset of the available communications beams are significant. As an example, only TRP communications beam #T4 216, TRP communications beam #T5 217, and TRP communications beam #T6 218, which are oriented directly or substantially directly towards UE 210 are significant receive beams. While, only UE communications beam #U1 222, UE communications beam #U2 223, and UE communications beam #U5 221, which are oriented directly or substantially directly towards TRP 205 are significant transmit beams. Each combination of transmit communications beam to receive communications beam is referred to as a transmit beam-receive beam combination (TRBC).

It is further noted that even among the significant communications beams, only a subset of the possible TRBCs of the significant communications beams are significant. As an illustrative example, the combination of UE communications beam #U1 222 and TRP communications beam #T5 217 are significant, as is the combination of UE communications beam #U2 223 and TRP communications beam #T6 218. However, the combination of UE communications beam #U5 221 and TRP communications beam #T6 218 may not be significant due to their orientations. Similarly, the combination of UE communications beam #U2 223 and TRP communications beam #T4 216 may not be significant.

Explicit feedback is a feedback technique whereby the received channel estimate in one direction, (i.e., downlink) is explicitly fed back to the transmitter. One way to perform explicit feedback is analog feedback. Analog feedback is a known feedback technique wherein information or a representation of the measured channel, such as fading coefficients, is fed back using an analog transmission technique. Explicit feedback has been proposed for use in multi-user multiple input multiple output (MU-MIMO) and interference channel (IC) scenarios. Therefore, explicit feedback is seen as a viable way to provide feedback, especially in situations when the feedback overhead is large.

According to an example embodiment, a system and method that uses explicit feedback (for example, analog feedback) in conjunction with beamformed uplink transmissions to convey downlink channel quality feedback are provided. The use of explicit feedback enables the use of a single transmit-receive beam combination to convey feedback for a plurality of TRBCs. The TRBC used to convey the explicit feedback is the best TRBC for a TRP-UE pair, for example. The TRBC may be selected on a metric, such as highest SNR, highest signal plus interference to noise ratio (SINR), highest received signal power level, and so forth, to determine the best TRBC for the TRP-UE pair.

The transmission of the feedback for the plurality of TRBCs on the single TRBC (that is selected to be the best TRBC) helps to improve feedback performance because all of the feedback information is received at the TRP with the best possible quality (i.e., best possible SNR).

An embodiment of this disclosure provides a technique wherein the channel responses (the information being fed back) are transmitted on the best TRBC per radio frequency (RF) chain when the different RF chains are multiplexed (such as when a frequency comb is used).

Figure 3A:
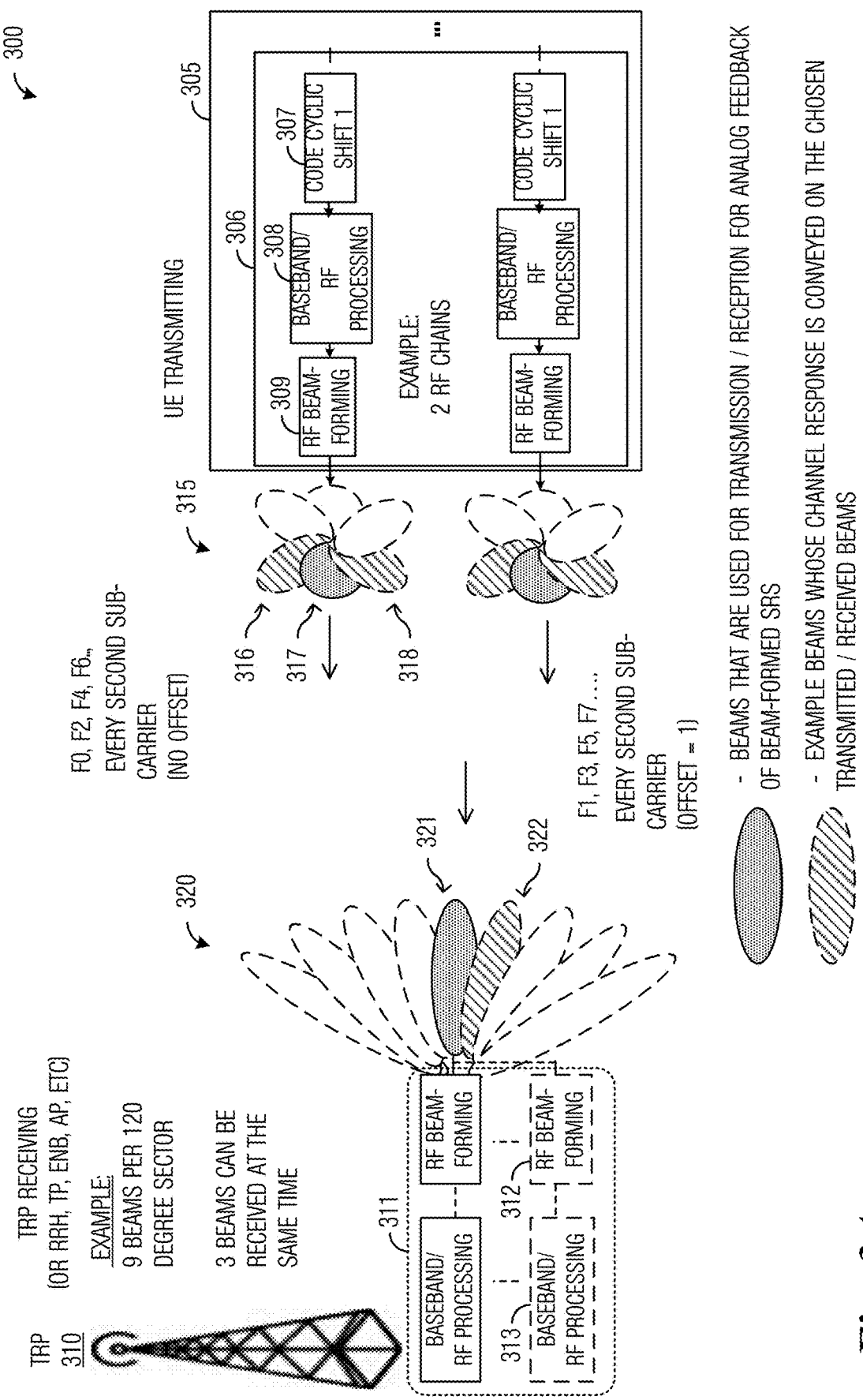
FIG. 3A illustrates an example communications system highlighting the transmission of explicit channel feedback on a best TRBC per RF chain according to example embodiments described herein.

FIG. 3A illustrates a communications system 300 highlighting the transmission of explicit channel feedback on a best TRBC per RF chain. The explicit channel feedback is a representation of the complex channel response. Communications system 300 includes a UE 305 and a TRP 310. UE 305 has transmit RF circuitry 306 with two RF chains, with each RF chain including cyclic shift (such as cyclic shift 307), a baseband/RF processor (such as baseband/RF processor 308), and a RF precoder (such as precoder 309). TRP 310 includes receive RF circuitry 311 with a plurality of RF chains, with each RF chain including a RF beamforming unit (such as RF beamforming unit 312) and a baseband/RF processor (such as baseband/RF processor 313). UE 305 communicates using a set of communications beams, such as set of communications beams 315 and TRP 310 communicates using a set of communications beams 320, a portion of which is shown in FIG. 3A. It is noted that although the two RF chains of UE 305 communicate using the same set of communications beams, due to the nature of the mmWave beams, some communications beams usable for communications by a first RF chain may not be usable by a second RF chain. Therefore, although the illustration presented in FIG. 3A displays the two RF chains using the same communications beams, different RF chains may use different communications beams in practice. Similarly, the different RF chains may also detect different communications beams of TRP 310. Hence, the discussion focusing on the two RF chains using the same communications beams at both UE 305 and TRP 310 should not be construed as being limiting to either the scope or the spirit of the example embodiments presented herein.

As discussed previously, the channel feedback for multiple TRBCs are transmitted using explicit feedback on a single TRBC. The single TRBC used to transmit the channel feedback is generally the best TRBC available.

Due to the relative positions of the UE and the TRP and the directional nature of beamformed communications, only subsets of the available communications beams are usually suitable for communications. As an example, UE communications beams 316, 317, and 318 of set of communications beams 315 and TRP communications beams 321 and 322 of set of communications beams 320 are suitable for communications between UE 305 and TRP 310 as shown in FIG. 3A. Other communications beams are directed away from the UE or the TRP and any transmissions occurring over those communications beams are unlikely to reach the intended recipient.

As presented previously, due to the nature of mmWave channels, usually only the communications beams with the best orientation between the communications devices will have the best quality. As shown in FIG. 3A, communications beams 317 and 321 are best oriented between UE 305 and TRP 310. Therefore, the combination of communications beams 317 and 321 is used to transmit the explicit channel feedback for all TRBCs for the first RF chain. In other words, the combination of communications beams 317 and 321 is used to convey explicit channel feedback for other TRBCs in addition to the combination of communications beams 317 and 321.

Both RF chains of UE 305 are used to transmit the explicit channel feedback, with a first RF chain transmitting a first subset of the explicit channel feedback on every second subcarrier with no offset (such as subcarriers F0, F2, F4, F6, and so on) for its chosen TRBCs and a second RF chain transmitting a second subset of the explicit channel feedback on every second subcarrier with an offset of one (such as subcarriers F1, F3, F5, F7, and so on) for its chosen TRBCs.

An embodiment of this disclosure provides a technique wherein the channel quality feedback (the information being fed back) is transmitted on the best TRBC on a subset of available radio frequency (RF) chains. As an example, if a UE has N RF chains, the embodiment technique uses M RF chains to transmit the explicit channel feedback, where M is less than N. At each of the M RF chains used to transmit the explicit channel feedback, a single TRBC is used to transmit channel responses for a plurality of TRBCs. When M is greater than one, multiplexing of the M RF chains may be used. If M is equal to one, multiplexing is not required.

Figure 3B:
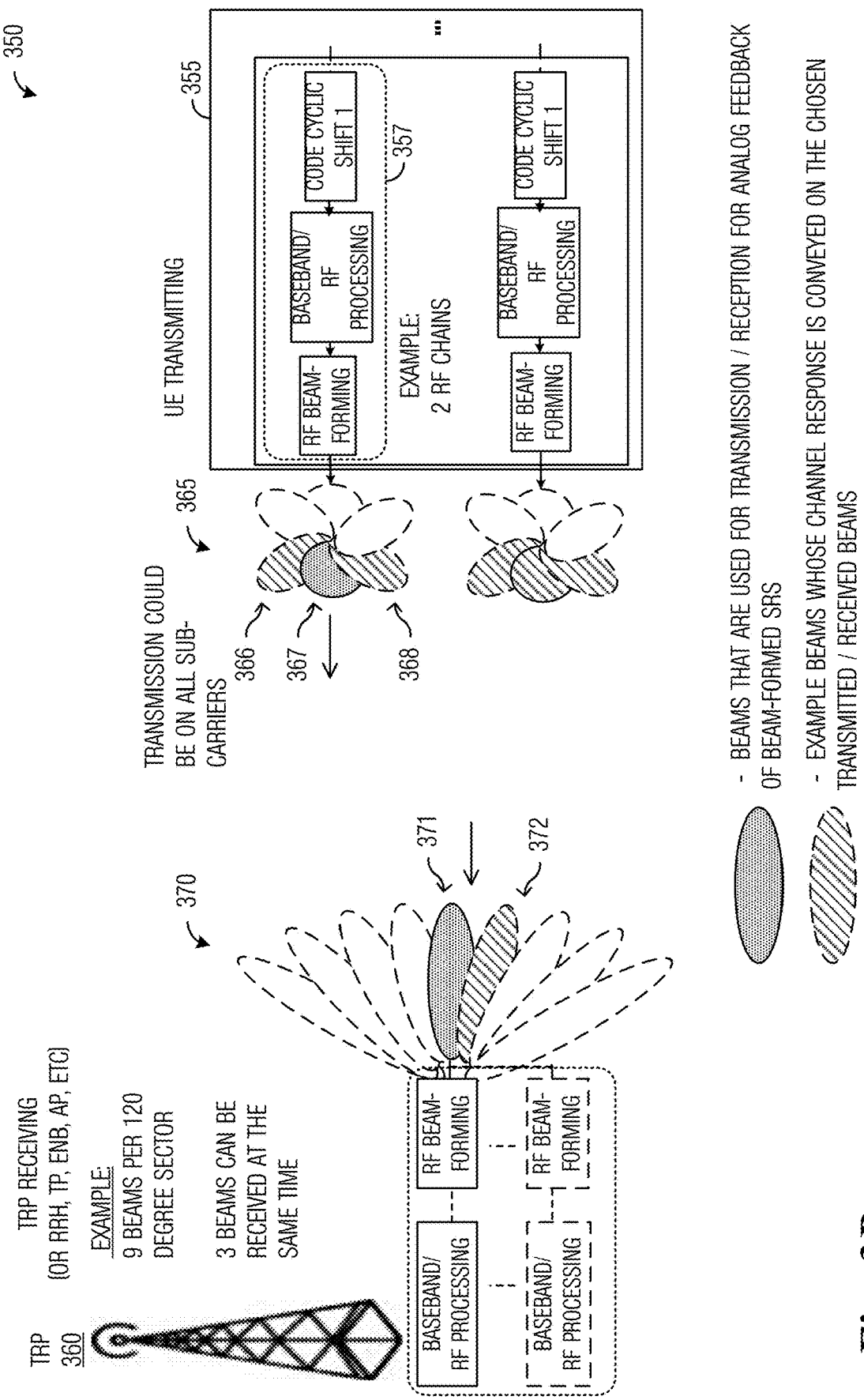
FIG. 3B illustrates a communications system highlighting the transmission of explicit channel feedback on a best TRBC on a subset of available RF chains according to example embodiments described herein.

FIG. 3B illustrates a communications system 350 highlighting the transmission of explicit channel feedback on a best TRBC on a subset of available RF chains. Communications system 350 includes a UE 355 and a TRP 360. UE 355 has RF circuitry with two RF chains, both of which can receive, but only one RF chain, such as a first RF chain (RF chain 357), is capable of transmitting. TRP 360 includes receive RF circuitry with a plurality of RF chains. UE 355 communicates using a set of communications beams, such as set of communications beams 365 and TRP 360 communicates using a set of communications beams 370, a portion of which is shown in FIG. 3B. Due to the relative positions, only subsets of the available communications beams are suitable. As an example, UE communications beams 366, 367, and 368 of set of communications beams 365 of RF chain 357 and TRP communications beams 371 and 372 of set of communications beams 370 are suitable for communications between UE 355 and TRP 360 as shown in FIG. 3B. Similar combinations of communications beams of the second RF chain and TRP communications beams 371 and 372 may also be suitable for communications between UE 355 and TRP 360, but are not explicitly labeled or discussed herein.

As shown in FIG. 3B, only one RF chain (e.g., RF chain 357) is used to transmit the explicit channel feedback for all TRBCs between UE 355 and TRP 360 (including the TRBCs between TRP 360 and both RF chains of UE 355). In other words, although the explicit channel feedback is transmitted on a single RF chain (RF chain 357 in this case), the explicit channel feedback being fed back includes feedback from TRBCs of both RF chains of UE 355 and TRP 360. It is noted that UE 355 has the second RF chain, which if capable could also be used to transmit the explicit channel feedback instead of RF chain 357, which is presented herein. The transmission of the explicit channel feedback may take place on all available subcarriers or a subset thereof. The use of a single RF chain (or more generally, a subset of the available RF chains) may be advantageous in situation where UE 355 has a smaller number of transmit RF chains than receive RF chains. The transmission from multiple RF chains of the explicit channel feedback may be multiplexed use time division multiplexing (TDM)), frequency division multiplexing (FDM), and/or code division multiplexing (CDM)). It is noted that the use of a subset of the available RF chains may result in each RF chain transmitting more signals.

Figure 4:
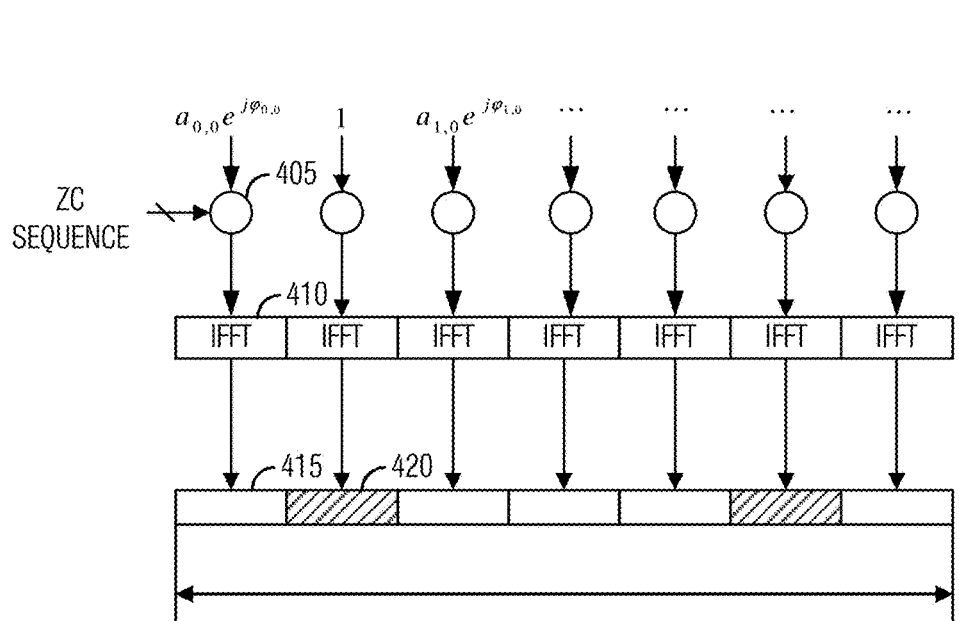
FIG. 4 illustrates circuitry used to modulate a sequence by an eigenvector.

A variety of explicit feedback techniques may be used to convey the channel quality feedback of the TRBCs on the best TRBC. A first known example technique, which is known as analog feedback, involves the UE using an eigenvector to modulate a known sequence in the uplink direction. This eigenvector is the strongest eigenvector derived from the single value decomposition (SVD) of the received downlink channel co-variance matrix for each subband from a particular antenna port of the TRP. The uplink sequence which is modulated may, for instance, be a Zadoff-Chu (ZC) sequence, i.e., which is presently the same family of sequences used in uplink DMRS. FIG. 4 illustrates example circuitry 400 used to modulate a sequence by an eigenvector. Circuitry 400 includes multipliers, such as multiplier 405, which multiplies the sequence with coefficients of the eigenvector. Output of the multipliers are converted into time domain data by inverse Fourier transforms, such as inverse Fast Fourier Transforms (IFFT) 410. Some of the time domain data, such as data 42o, make up the reference sequence, while others, such as data 415, do not.

Figure 5:
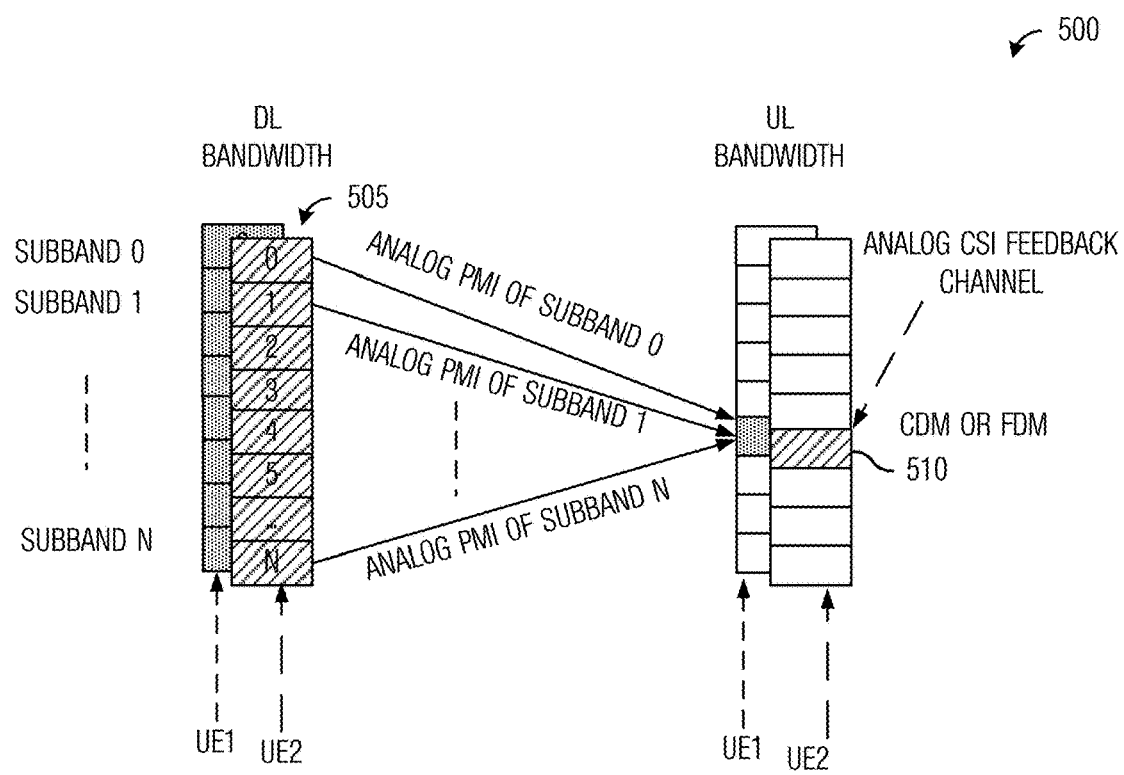
FIG. 5 illustrates a diagram of the multiplexing of feedback from multiple UEs.

For the above known state of the art techniques to work unmodulated uplink DMRS signals also need to be transmitted as a reference. The unmodulated DMRS signals are used as a reference signal for one of the ports of the TRP. In a situation when multiple subbands are to be reported, additional modulated symbols may be required. The additional symbols may be CDM using different cyclic shifts or FDM. Multiple users can also be multiplexed. FIG. 5 illustrates a diagram 500 of the multiplexing of feedback from multiple UEs. As shown in FIG. 5, for each user, analog feedback for each of N downlink subbands (e.g., N downlink subbands 505 for user UE2) is mapped to an analog feedback channel (e.g., feedback channel 510 for user UE2). The analog feedback channels may be multiplexed using CDM or FDM. SVD of the co-variance matrix of the beamformed channel may be used to allow the analog feedback channels to convey the channel responses of the different TRBCs.

According to an example embodiment, the explicit channel feedback is transmitted using a modified uplink resource. In a first example embodiment, the modified uplink resource is a modified uplink physical resource block (PRB), which typically for LTE already has two demodulation reference signals (DMRS) resources. In a second example embodiment, the modified uplink resource is a modified SRS resource. Detailed discussions of the transmission of the explicit feedback using the modified uplink resources are presented below.

According to an example embodiment, the UE is able to select TRP communications beams that correspond to the best UE communications beams and provide explicit feedback of the corresponding TRBC beams. The TRP may specify a maximum number of UE communications beams.

Figure 6A:
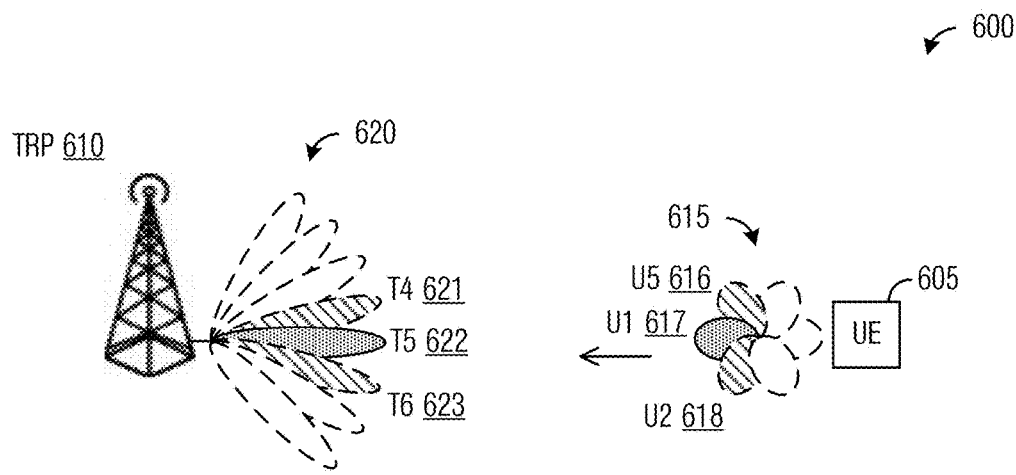
FIG. 6A illustrates a portion of a communications system highlighting a first example communications beam configuration between a UE and a TRP according to example embodiments described herein.

FIG. 6A illustrates a portion of a communications system 600 highlighting a first example communications beam configuration between a UE and a TRP. Communications system 600 includes a UE 605 and a TRP 610. UE 605 communicates using a set of communications beams 615, which includes UE communications beams #U5 616, #U1 617, and #U2 618 that are oriented or substantially oriented towards TRP 610. TRP 610 communicates using a set of communications beams 620, which includes TRP communications beams #T4 621, #T5 622, and #T6 623 that are oriented or substantially oriented towards UE 605. In an embodiment, UE 605 transmits the explicit channel feedback associated with downlink transmissions made by TRP 610 on TRP communications beams #T4 621, #T5 622, and #T6 623 and received by UE 605 on UE communications beams #U5 616, #U1 617, and #U2 618 using TRBC of communications beam #U1 617 and #T5 622.

Figure 6B:
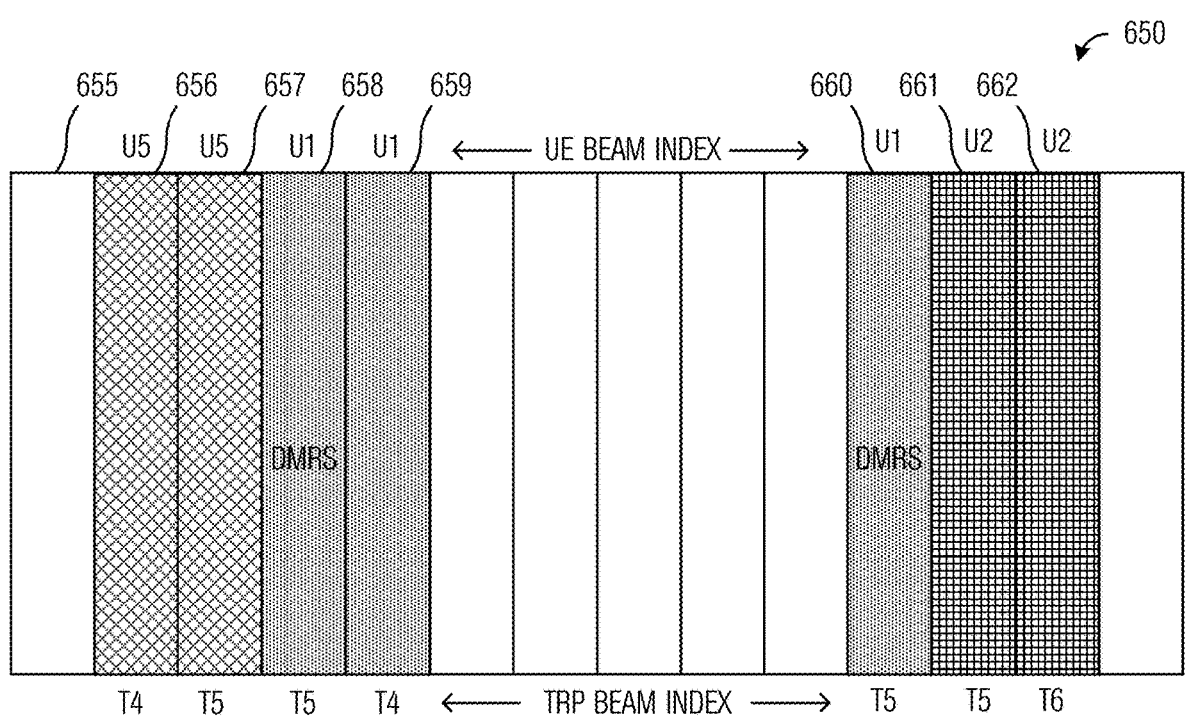
FIG. 6B illustrates an example modified physical resource block (PRB) used to transmit explicit channel feedback from a plurality of TRBCs on a single TRBC for a communications system as shown in FIG. 6A according to example embodiments described herein.

FIG. 6B illustrates an example modified uplink PRB 650, which is used to transmit the explicit downlink channel feedback from a plurality of TRBCs on a single uplink TRBC for a communications system as shown in FIG. 6A. As shown in FIG. 6B, modified resource 650 is a modified physical resource block (PRB) used to transmit the DMRS. Modified resource 650 includes 14 data symbols, such as data symbols 655-662, and 12 subcarriers.

In the situation associated with modified uplink PRB 650, the UE is configured to provide feedback for a plurality (e.g., three) of the best UE communications beams of the UE and the UE signals to the TRP the beam indices of the chosen TRP communications beams associated with the plurality of these best UE communications beams. As an illustrative example, the UE may signal the beam indices of the chosen TRP communications beams associated with the plurality of the best UE communications beams in an uplink control channel, such as physical uplink control channel (PUCCH), for example.

Some data symbols, such as data symbols 658 and 660, may be used to transmit the DMRS in an unmodified way in an unmodified resource used to transmit the DMRS. These data symbols are needed to act as a uplink reference for the other modulated DMRS symbols, such as modulated DMRS symbols 656, 657, 659, 661 and 662. Some data symbols, such as data symbols 656, 657, 659, 661, and 662, may be used to transmit the explicit channel feedback as modulated DMRS sequences. Other data symbols, such as data symbol 655, may be used for other purposes or are unused. It is noted that the entry in the PUCCH contents for the DMRS OFDM symbol (such as data symbols 658 or 660) may not be needed and may be replaced by a null entry to further reduce overhead.

The cross-hatching of the data symbols shown in FIG. 6B correspond to the beam index of communications beams of the UE. As an example, the shaded data symbols (data symbols 658, 659, and 660) correspond to UE communications beam #U1 617 of the UE (as shown in FIG. 6A), while the diagonally cross-hatched data symbols (data symbols 656 and 657) correspond to UE communications beam #U5 616 of the UE and the vertically-horizontally cross-hatched data symbols (data symbols 661 and 662) correspond to UE communications beam #U2 618 of the UE. Furthermore, each data symbol used to convey the channel responses conveys the explicit channel feedback for a single TRBC. Therefore, although multiple data symbols may be associated with a single UE communications beam, each of the multiple data symbols are associated with different TRP communications beams. As an illustrative example, data symbols 656 and 657 are associated with UE communications beam #U5 616 of the UE, but data symbol 656 is associated with TRP communications beam #T4 621 of the TRP and data symbol 657 is associated with TRP communications beam #T5 622 of the TRP. It is noted that in the example presented in FIG. 6B, the feedback is restricted to two TRP communications beams per UE communications beam. In a different situation where a single UE communications beam is associated with a different number of TRP communications beams, the configuration of the UE and the use of the modified resources would differ.

According to an example embodiment, the TRP allows the UE free reign regarding the selection of the UE and the TRP communications beams. The TRP may specify a maximum number of TRP communications beams and/or UE communications beams. Instead of the actual beam indices of the UE communications beams, the TRP assigns a virtual beam index to the best UE communications beams in the order in which the feedback is received by the TRP. The UE will be able to recover the actual beam indices, such as when the TRP signals to the UE that a particular virtual beam index is to be used by the UE, as the UE knows the order in which the UE beams were used when the explicit channel feedback was last performed.

Figure 7A:
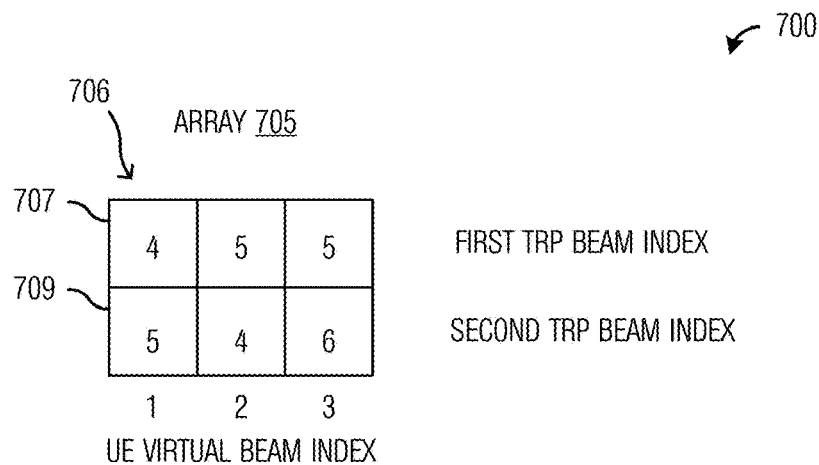
FIG. 7A illustrates an example PUCCH content according to example embodiments described herein.

FIG. 7A illustrates an example PUCCH content 700. PUCCH content 700 includes a 3×2 array 705 of numbers. Each of the three columns corresponds to a different UE virtual index, e.g., 1, 2, and 3. For example, column #1 706 corresponds to virtual index 1, which is the first UE communications beam received by the TRP. For each of the columns, there are two cells that store a first and a second TRP communications beam indices. It is noted that the number of cells per column may be specified by the TRP as the maximum number of TRP beams (as part of the configuration), or may alternatively be set by the UE, a technical standard, or an operator of the communications system, and so on. As an illustrative example, cell 707 indicates that a first feedback received from the UE will include an explicit channel feedback corresponding to TRP communications beam #T4 of the TRP and virtual communications beam #V1 [virtual beam index #1] of the UE and cell 709 indicates that a second feedback received from the UE will include an explicit channel feedback corresponding to TRP communications beam #T5 of the TRP and virtual communications beam #V1 [virtual beam index #1] of the UE. It is noted that the overhead (in number of bits) associated with this form of index signaling is expressible as $$\text{Number of bits}=X*Y*\text{Ceiling}(\text{Log2}(\text{Total number of TRP beams})),$$

where X is the number of UE communications beams which have been selected to provide explicit channel feedback (in this case 3), Y is the number of TRP communications beams oriented towards the UE, and Ceiling(.) is a function returning the smallest integer number greater than (.).

Figure 7B:
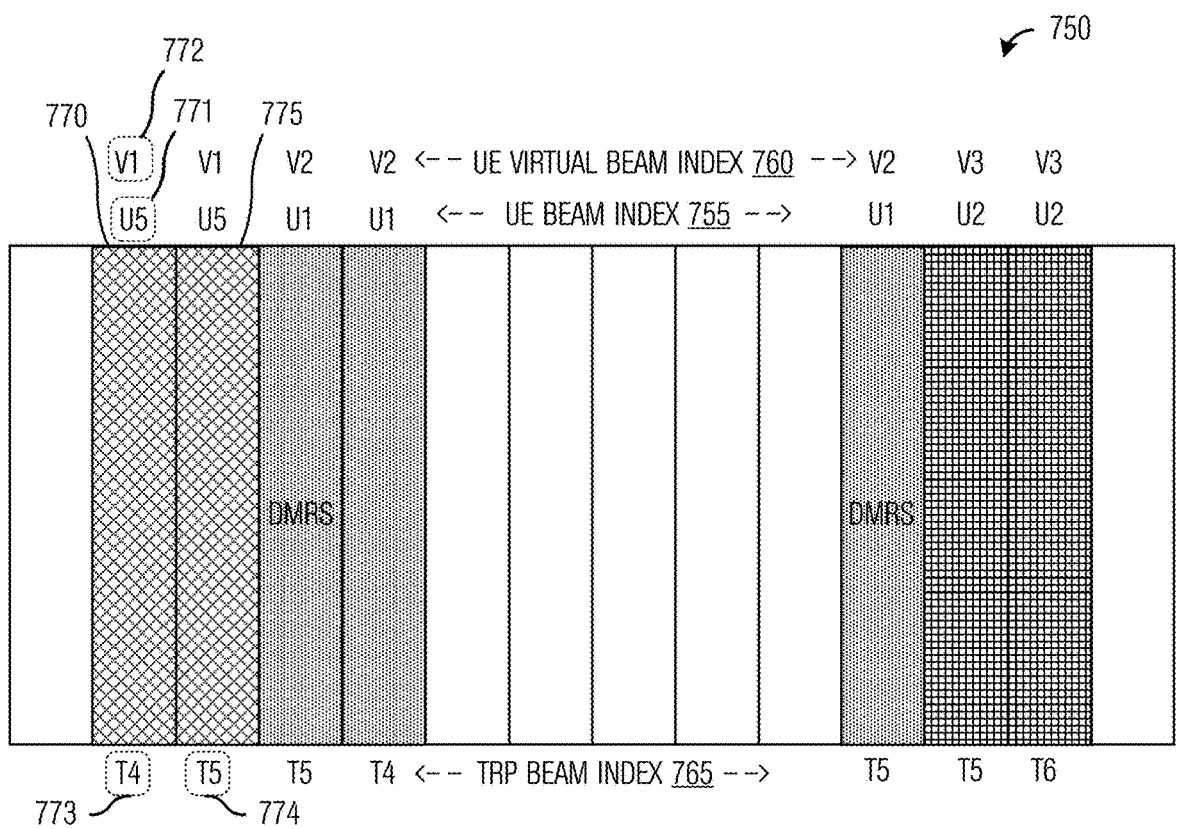
FIG. 7B illustrates an example modified uplink PRB used to transmit feedback from a plurality of TRBCs on a single TRBC configured using virtual indices as described in FIGS. 6A and 7A according to example embodiments described herein.

FIG. 7B illustrates an example modified uplink PRB 750 used to transmit feedback from a plurality of TRBCs on a single TRBC configured using virtual indices as described in FIGS. 6A and 7A. Modified uplink PRB 750 includes 14 data symbols and 12 subcarriers. A first set of indices 755 indicate the UE communications beam indices associated with some of the data symbols of modified resource 750. As an example, data symbol 770 is associated with UE communications beam #U5 as indicated by UE communications beam index #U5 771. A second set of indices 760 indicate the virtual communications beam indices associated with some of the data symbols of modified resource 750. As an example, data symbol 770 is associated with virtual communications beam index #V1 772 indicating that UE communications beam #U5 is the first UE beam received by the TRP. A third set of indices 765 indicate the TRP communications beam indices associated with some of the data symbols of modified uplink PRB 750. As an example, data symbol 770 is associated with TRP communications beam #T4 (as indicated by index T4 773) and data symbol 775 is associated with TRP communications beam #T5 (as indicated by index T5 774).

The UE and the TRP may be able to determine the TRBC associated with a data symbol in accordance with the indices associated with the data symbol. As an illustrative example, consider data symbol 770. The indices associated with data symbol 770 are as follows: virtual communications beam index #V1 and TRP communications beam index #T4. Therefore, the UE and the TRP is able to determine that the explicit channel feedback conveyed in data symbol 770 corresponds to the TRBC of UE communications beam #U5 and TRP communications beam #T4.

According to an example embodiment, the TRP informs the UE of the indices of the actual TRP communications beams that the UE will provide explicit feedback for, while allowing the UE to select the best UE communications beams. The TRP may specify a maximum number of UE communications beams. The TRP communications beams specified by the TRP may be selected in accordance with measurements of uplink transmissions made previously by the UE, for example. Because the TRP has already specified the TRP communications beams, the UE does not have to make nor signal (using the PUCCH, for example) its own choices for TRP communications beams to the TRP.

Figure 8A:
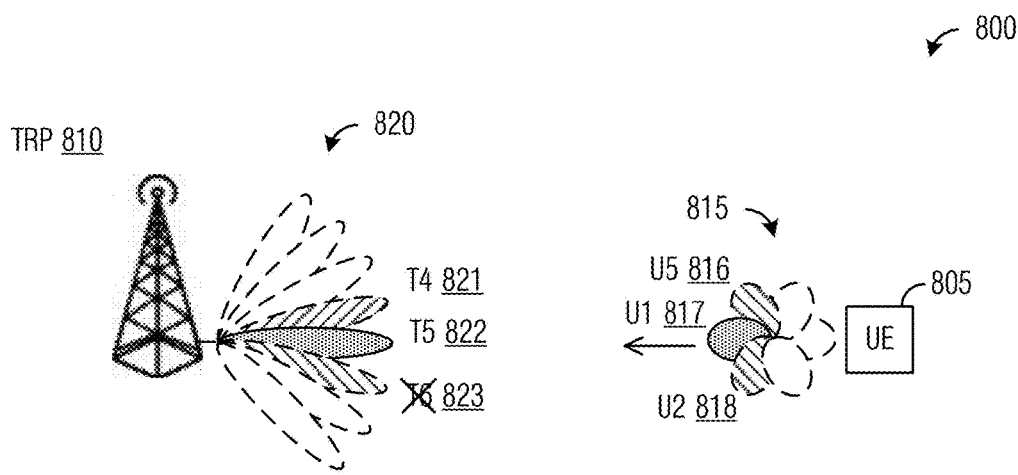
FIG. 8A illustrates a portion of a communications system highlighting an example communications beam configuration between a UE and a TRP, where the TRP specifies indices of TRP communications beam for which the UE will provide feedback according to example embodiments described herein.

FIG. 8A illustrates a portion of a communications system 800 highlighting an example communications beam configuration between a UE and a TRP, where the TRP specifies indices of TRP communications beam for which the UE will provide feedback. Communications system 800 includes a UE 805 and a TRP 810. UE 805 communicates using a set of communications beams 815, which includes UE communications beams #U5 816, #U1 817, and UE #U2 818 that are oriented or substantially oriented towards TRP 810. TRP 810 communicates using a set of communications beams 820, which includes TRP communications beams #T4 821, #T5 822, and #T6 823 that are oriented or substantially oriented towards UE 805. For discussion purposes, consider a situation where TRP 810 specifies that UE 805 will only provide feedback for TRP communications beams #T4 812 and #T5 822. In an embodiment, UE 805 transmits the explicit channel feedback associated with downlink transmissions made by TRP 810 on TRP communications beams #T4 821 and #T5 822 and received by UE 805 on communications beams #U5 816, #U1 817, and #U2 818 using TRBC of communications beam #U1 817 and #T5 822. It is noted that although TRP 810 specifies that UE 805 not report feedback related to TRP communications beam #T6 823, TRP 810 may still sound on TRP communications beam #T6 823.

Figure 8B:
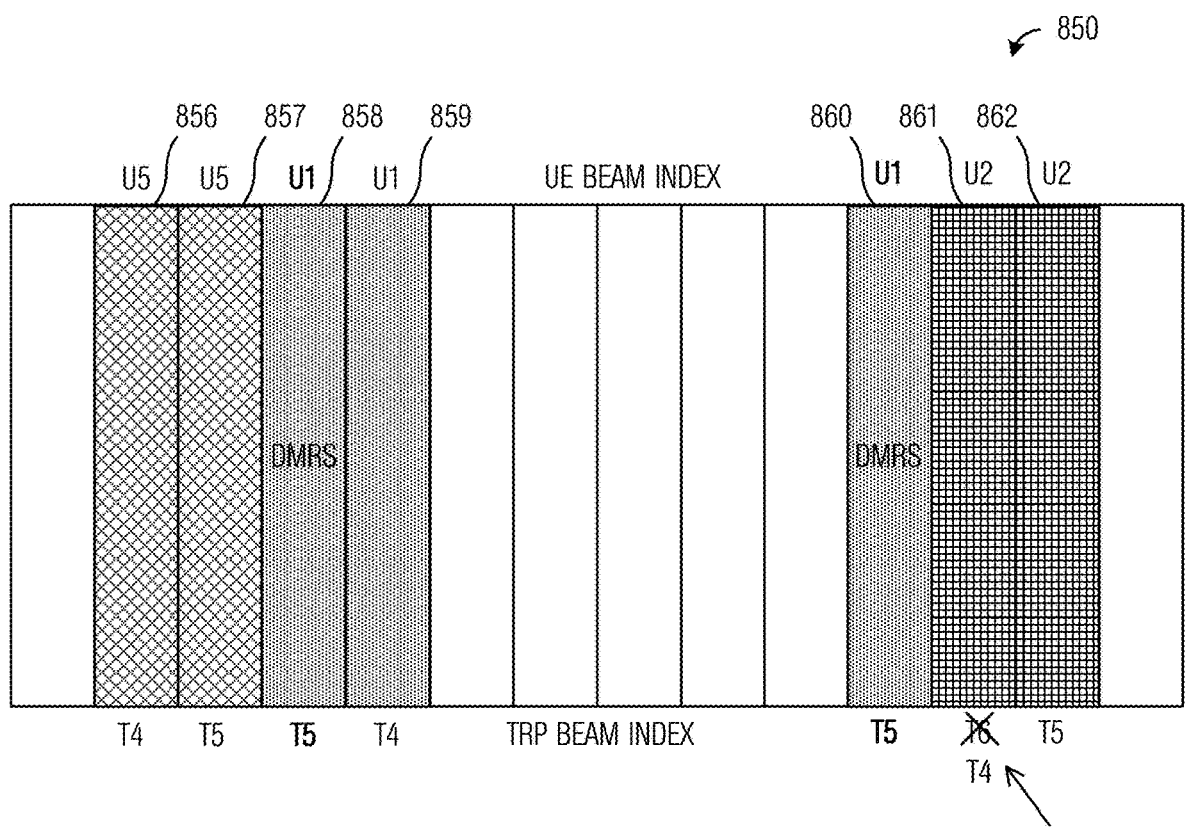
FIG. 8B illustrates an example modified uplink PRB used to transmit feedback from a plurality of TRBCs on a single TRBC for a communications system as shown in FIG. 8A according to example embodiments described herein.

FIG. 8B illustrates an example modified uplink PRB 850 used to transmit feedback from a plurality of TRBCs on a single TRBC for a communications system as shown in FIG. 8A. As shown in FIG. 8B, modified uplink PRB 850 is a modified uplink PRB which is normally used to transmit two DMRS symbols. Modified uplink PRB 850 includes 14 data symbols and 12 subcarriers.

Some data symbols, such as data symbols 858 and 860, of uplink PRB 850 may be used to transmit the DMRS in an unmodulated way and in an unmodified resource. Some data symbols, such as data symbols 856, 857, 859, 861, and 862, may be used to transmit the explicit channel feedback.

The cross-hatching of the data symbols shown in FIG. 8B correspond to the beam index of communications beams of the UE. As an example, the shaded data symbols (data symbols 858, 859, and 860) correspond to UE communications beam #U1 817 of the UE, while the diagonally cross-hatched data symbols (data symbols 856 and 857) correspond to UE communications beam #U5 816 of the UE and the vertically-horizontally cross-hatched data symbols (data symbols 861 and 862) correspond to UE communications beam #U2 818 of the UE. Furthermore, each data symbol used to convey the explicit channel feedback conveys the explicit channel feedback for a single TRBC. Therefore, although multiple data symbols may be associated with a single UE communications beam, each of the multiple data symbols are associated with different TRP communications beams. As an illustrative example, data symbols 856 and 857 are associated with UE communications beam #U5 816 of the UE, but data symbol 856 is associated with TRP communications beam #T4 821 of the TRP and data symbol 857 is associated with TRP communications beam #T5 822 of the TRP. It is noted that although TRP communications beam #T6 823 may be a better communications beam when the UE is communicating using UE communications beam #U2 818, because the TRP has restricted the UE to only reporting feedback for TRP communications beams #T4 821 and #T5 822, data symbol 861 is used to report feedback for TRP communications beam #T4 821 as received by UE communications beam #U2 818 instead of TRP communications beam #T6 823.

According to an example embodiment, the TRP informs the UE of a set of TRP communications beams that the UE will select from, when providing explicit channel feedback, while allowing the UE to select the best UE communications beams. The TRP may specify a maximum number of UE communications beams. The TRP communications beams specified by the TRP in the set of TRP communications beams may be selected in accordance with measurements of uplink transmissions made previously by the UE, for example. The UE is given freedom to select different UE communications beams to be associated with different TRP communications beams. Furthermore, the restriction of the UE to the set of TRP communications beams helps to reduce the signaling overhead because the UE has to only indicate its TRP communications beams choice(s) from a smaller number of TRP communications beams.

Figure 9A:
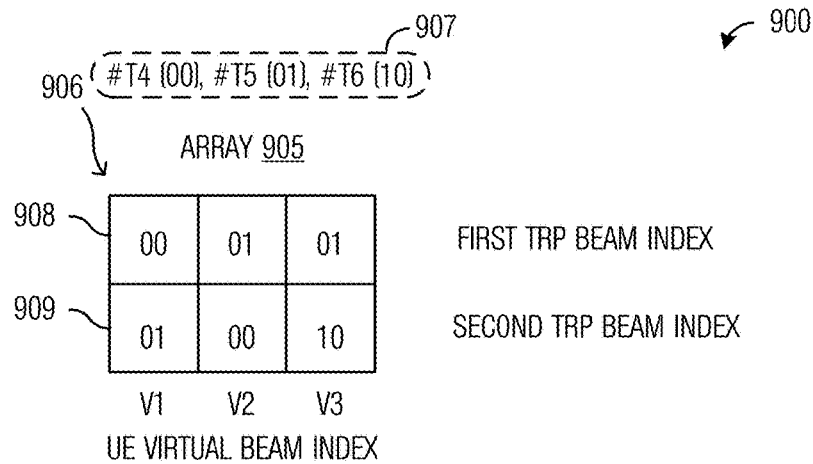
FIG. 9A illustrates an example PUCCH content where the TRP has limited the UE to select TRP communications beams from a set of TRP communications beams according to example embodiments described herein.

FIG. 9A illustrates an example PUCCH content 900 where the TRP has limited the UE to select TRP communications beams from a set of TRP communications beams. PUCCH content 900 includes a 3×2 array 905 of bits. Each of the three columns correspond to a different UE vritual index, e.g., 1, 2, and 3. As an example, column #1 906 corresponds to virtual index 1, which is the first UE communications beam received by the TRP. For each of the columns, there are two cells that store a first and a second TRP communications beam indices. The contents of the cells may be bits representing indices of different TRP communications beams in the set of TRP communications beams, which are shown as highlight 907, for example. Because the set of TRP communications beams includes only three TRP communications beams, two bits is sufficient to represent the indices of the TRP communications beams. As a comparison, in a situation wherein the UE is free to select any TRP communications beams and the TRP communicates using 32 TRP communications, 5 bits is needed to represent the indices of the TRP communications beams.

As an example, cell 908 indicates that a first feedback received from the UE will include an explicit channel feedback corresponding to TRP communications beam "00" (TRP communications beam #T4) and virtual communications beam #V1 [virtual beam index #1] and cell 909 indicates that a second feedback received from the UE will include an explicit channel feedback corresponding to TRP communications beam "01" (TRP communications beam #T5) and virtual communications beam #V1 [virtual beam index #1]. It is noted that the overhead (in number of bits) associated with this form of index signaling is expressible as Number of bits=$A*B$*Ceiling(Log2(Number of TRP beams in set))

where A is the maximum number of UE communications beams for which an explicit channel feedback can be made, and B is the maximum number of TRP communications beams for which an explicit channel feedback can be made.

Figure 9B:
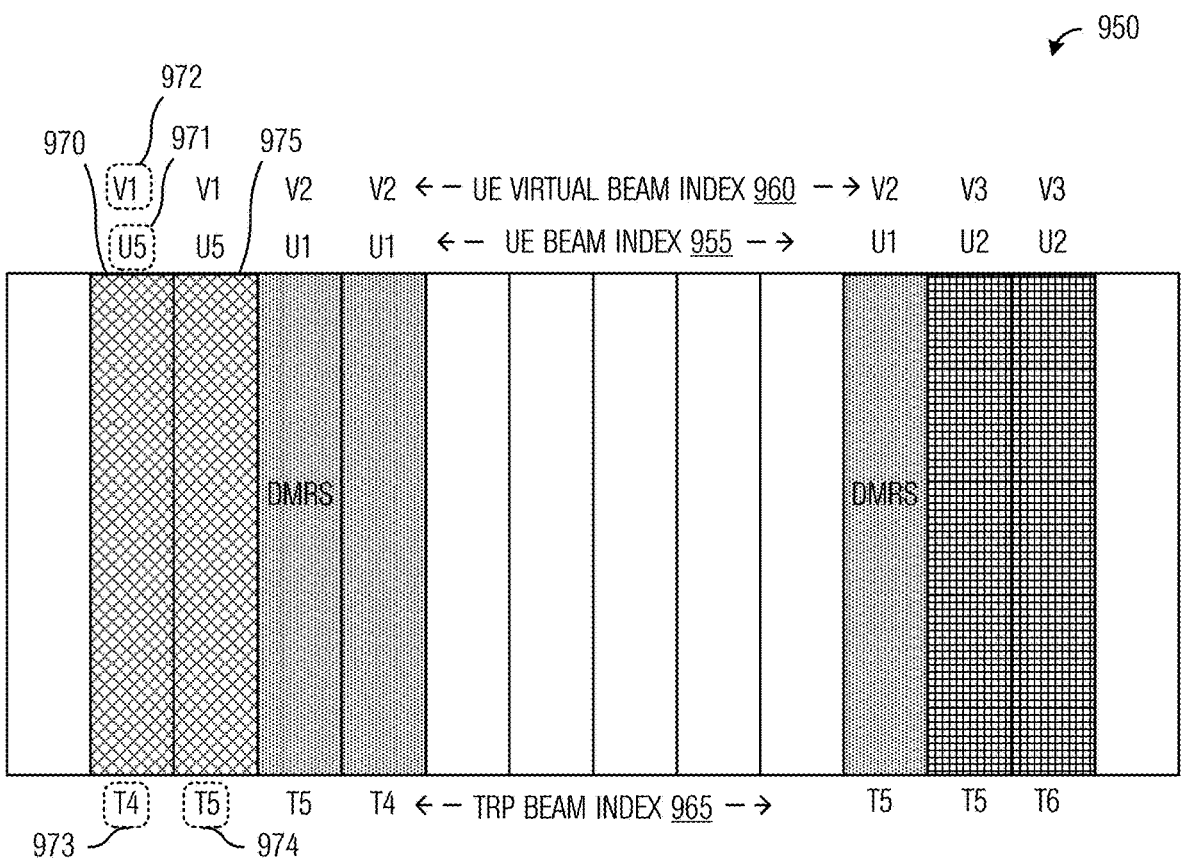
FIG. 9B illustrates a modified resource used to transmit feedback from a plurality of TRBCs on a single TRBC configured using virtual indices as described in FIG. 9A according to example embodiments described herein.

FIG. 9B illustrates an example modified uplink PRB 950 used to transmit feedback from a plurality of TRBCs on a single TRBC configured using virtual indices as described in FIG. 9A. Modified uplink PRB 950 includes 14 data symbols and 12 subcarriers. A first set of indices 955 indicate the UE communications beam indices associated with some of the data symbols of modified uplink PRB 950. As an example, data symbol 970 is associated with UE communications beam #U5 as indicated by UE communications beam index #U5 971. A second set of indices 960 indicate the virtual communications beam indices associated with some of the data symbols of modified uplink PRB 950. As an example, data symbol 970 is associated with virtual communications beam index #V1 972 indicating that UE communications beam #U5 is the first UE beam received by the TRP. A third set of indices 965 indicate the TRP communications beam indices associated with some of the data symbols of modified uplink PRB 950. As an example, data symbol 970 is associated with TRP communications beam #T4 (as indicated by index T4 973) and data symbol 975 is associated with TRP communications beam #T5 (as indicated by index T5 974).

The UE and the TRP may be able to determine the TRBC associated with a data symbol in accordance with the indices associated with the data symbol. As an illustrative example, consider data symbol 970. The indices associated with data symbol 970 are as follows: virtual communications beam index #V1 and TRP communications beam index #T4. Therefore, the UE and the TRP are able to determine that the channel quality feedback conveyed in data symbol 970 corresponds to the TRBC of UE communications beam #U5 and TRP communications beam #T4. It is noted that the entry in the PUCCH contents containing the chosen TRP beam index for the two unmodulated DMRS symbols in modified uplink PRB 950, may not be needed and may be replaced by a null entry to further reduce overhead.

In situations where the modified resources, shown as shaded resources (hatched, cross hatched etc) symbols for each TRBC are modulating sequences (i.e., same sequence as the unmodulated DMRS symbols), as would be the case for analog modulation, different RF chains may be simultaneously sounded using different sequences (using different cyclic shifts or root sequences, for example), or different RF chains may be staggered in time (one RF chain at a time, for example). Different UEs may also use different DMRS sequences or different time periods to enable feedback from different UEs.

It may also be possible that different subbands need to be separately sounded, but because the communications channels are beamformed, the channel quality feedback will be flat. Therefore, only a limited number of subbands will be needed for the different UEs. The different subbands may also be multiplexed in time, frequency, code space, or a combination thereof.

The example embodiments presented in FIGS. 6A-9B utilize a modified uplink PRB to convey the feedback from the UEs. It is also possible to use a modified SRS resource to convey the feedback from the UEs. The analog modulated SRS resource may be configured under the umbrella of SRS-like configuration and transmission.

According to an example embodiment, an SRS-like technique is provided for conveying the channel quality feedback of different SRS beam combinations using explicit feedback. A modified SRS resource is used to convey the channel quality feedback. Currently, in 3GPP LTE-Advanced (LTE-A), the SRS is transmitted in the last symbol of a subframe with a certain time periodicity. A UE specific configuration is used to multiplex different UEs in time, frequency (using different frequency combs and bandwidth, for example), and code space. An extended ZC sequence is used, which can multiplex eight UEs onto the same subcarrier(s) using different cyclic shifts of the same root sequence. The SRS may be periodically or aperiodically transmitted, but all share the same set of TRP assigned SRS resources.

According to an example embodiment, multiple adjacent symbols of a modified SRS resource are used for modulating different SRS sequences for one UE on a single RF chain. A single best TRBC is used for all SRS transmission and may also be transmitted as a reference. Different RF chains from a single UE may be assigned different frequency combs (if each UE is assigned only one code) to enable the more rapid transmission of the feedback. Different UEs may be assigned to different cyclic shifts of the same root ZC sequence to allow for the reuse of the same resource elements (REs).

Figure 10A:
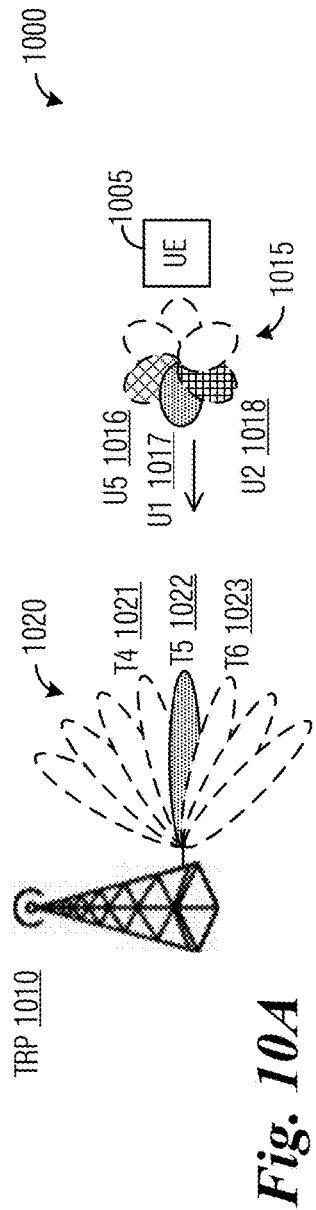
FIG. 10A illustrates a portion of a communications system highlighting a second example communications beam configuration between a UE and a TRP according to example embodiments described herein.

FIG. 10A illustrates a portion of a communications system 1000 highlighting a second example communications beam configuration between a UE and a TRP. Communications system 1000 includes a UE 1005 and a TRP 1010. UE 1005 communicates using a set of communications beams 1015, which includes UE communications beams #U5 1016, #U1 1017, and #U2 1018 that are oriented or substantially oriented towards TRP 1010. TRP 1010 communicates using a set of communications beams 1020 (a portion of which is shown in FIG. 10A), which includes TRP communications beams #T4 1021, #T5 1022, and #T6 1023 that are oriented or substantially oriented towards UE 1005. In an embodiment, UE 1005 transmits feedback comprising the channel quality feedback associated with downlink transmissions made by TRP 1010 on TRP communications beams #T4 1021, #T5 1022, and #T6 1023 and received by UE 1005 on UE communications beams #U5 1016, #U1 1017, and #U2 1018 using TRBC of communications beam #U1 1017 and #T5 1022, which is the best TRBC (in terms of SNR, SINR, received signal strength, error rate, and so on, for example). The feedback is conveyed in a modified SRS resource.

Figure 10B:
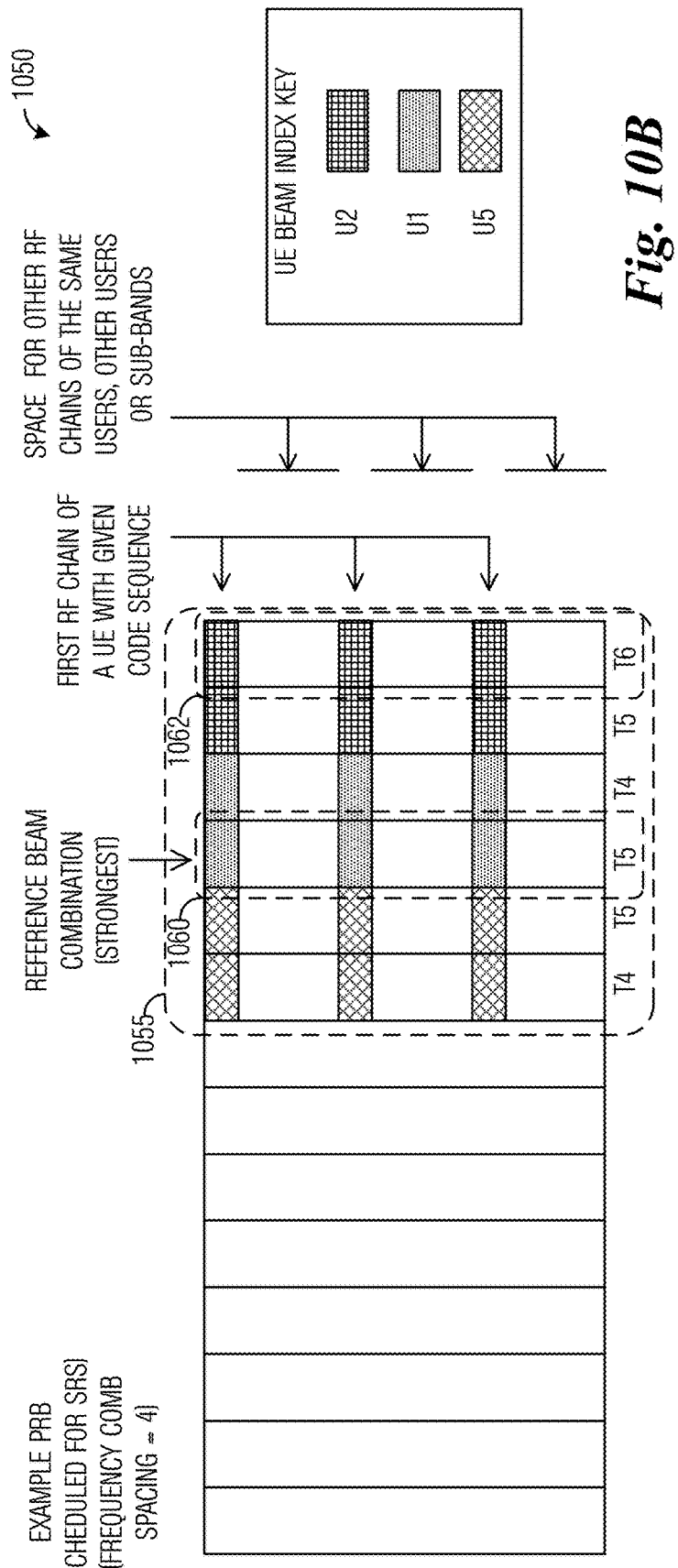
FIG. 10B illustrates an example PRB including a modified SRS resource used to convey feedback according to example embodiments described herein.

FIG. 10B illustrates an example PRB 1050 including a modified SRS resource 1055 used to convey feedback. PRB 1050 is schedule for SRS transmission with a frequency comb spacing of four. As shown in FIG. 10B, modified SRS resource 1055 includes six data symbols, such as data symbols 1060 and 1062, with a subset of subcarriers available in the data symbols being used to convey the feedback from a single RF chain. As an illustrative example, three subcarriers per data symbol are used to convey the feedback. The subcarriers are spread throughout the data symbols to enable frequency diversity, for example. Other subcarriers of the data symbols that are not used by the single RF chain may be used by other RF chains of the same UE or by other UEs to convey other feedback.

Different data symbols convey feedback for different TRBCs. The subcarriers shown in FIG. 10B as being assigned to convey feedback are cross-hatched to indicate the UE communications beam index with which they are associated. As an example, the subcarriers of data symbol 1060 are shaded to indicate that they convey feedback for UE communications beam #U1, while the subcarriers of data symbol 1062 are cross-hatched with a vertical-horizontal pattern to indicate that they convey feedback for UE communications beam #U2. In a manner similar to the example embodiments previously discussed, different data symbols are associated with different TRP communications beams. As an example, data symbol 1060 is associated with TRP communications beam #T5 (hence the feedback conveyed in data symbol 1060 is for UE communications beam #U1 and TRP communications beam #T5) and data symbol 1062 is associated with TRP communications beam #T6 (hence the feedback conveyed in data symbol 1062 is for UE communications beam #U2 and TRP communications beam #T6). The data symbol corresponding to the best TRBC (e.g., data symbol 1060) may be used as a reference signal. It is noted that in the example presented in FIG. 10B, the feedback is restricted to two TRP communications beam per UE communications beam. In a different situation where a single UE communications beam is associated with a different number of TRP communications beams, the configuration of the modified SRS resource would differ.

Figure 11A:
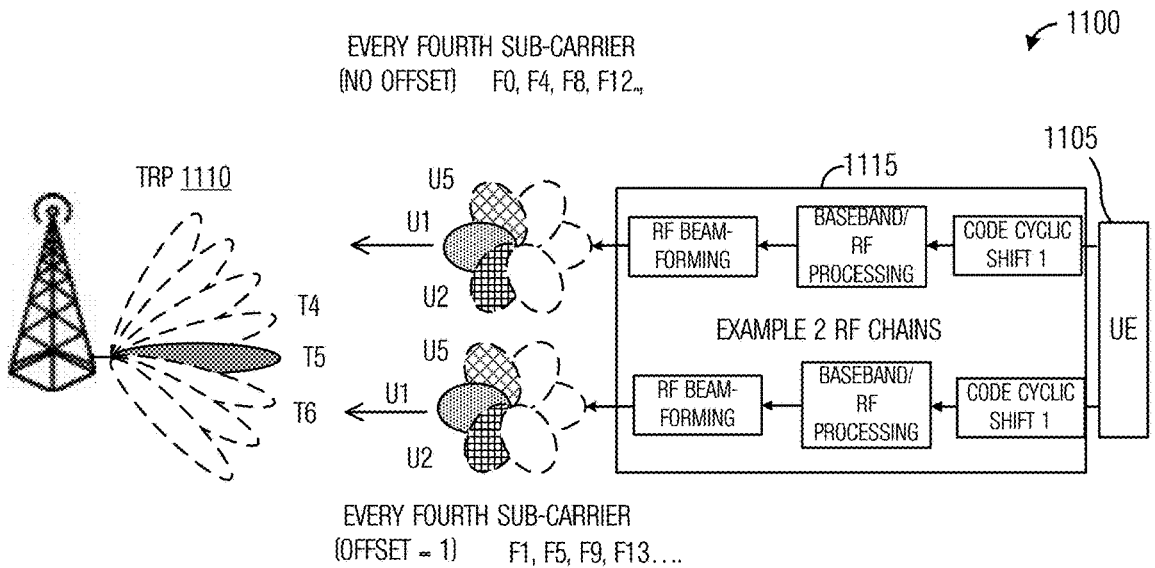
FIG. 11A illustrates an example communications system highlighting a modified SRS resource conveying feedback transmitted on two RF chains of a single UE according to example embodiments described herein.

FIG. 11A illustrates an example communications system 1100 highlighting a modified SRS resource conveying feedback transmitted on two RF chains of a single UE. Communications system 1100 includes a UE 1105 and a TRP 1110. As shown in FIG. 11A, UE 1105 includes two RF chains 1115, each configured to transmit feedback to TRP 1110. Each RF chain is configured to transmit feedback TRP 1110 using different subcarriers of a modified SRS resource. As an example, a first RF chain may use every fourth subcarrier with no offset (e.g., the first RF chain uses subcarriers F0, F4, F8, F12, and so on). While a second RF chain may use every fourth subcarrier with an offset of one (e.g., the second RF chain uses subcarriers F1, F5, F9, F13, and so on).

Figure 11B:
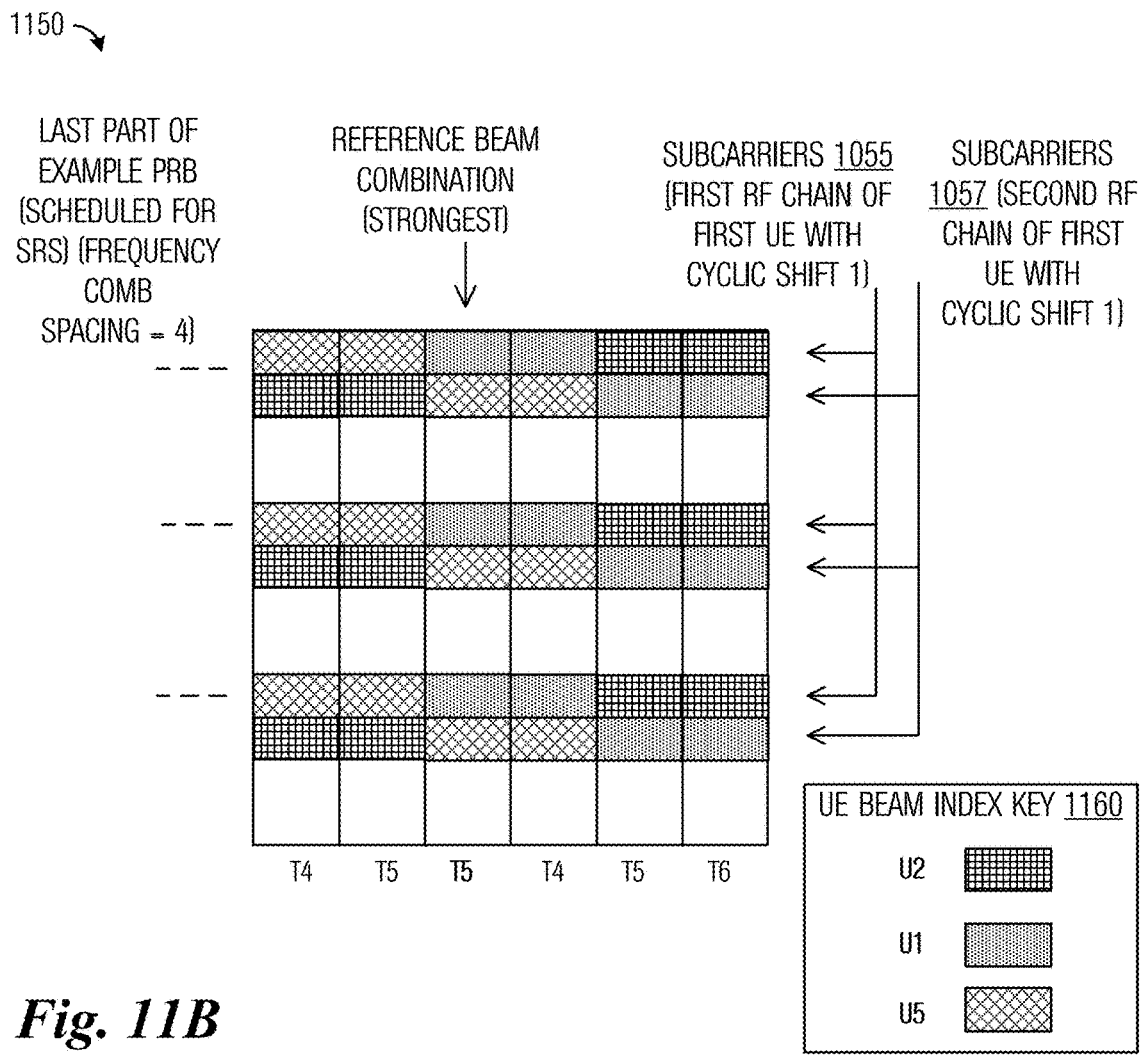
FIG. 11B illustrates a modified SRS resource conveying feedback as described in FIG. 11A according to example embodiments described herein.

FIG. 11B illustrates a modified SRS resource 1150 conveying feedback as described in FIG. 11A. Modified SRS resource 1150 may be a portion of a PRB scheduled for SRS transmission with a frequency comb spacing of four, for example. A first group of subcarriers 1055 is used convey explicit feedback transmitted by the first RF chain and a second group of subcarriers 1057 is used to convey explicit feedback transmitted by the second RF chain. The subcarriers are cross-hatched to indicate the UE communications beams with which they are associated. UE beam index key 1160 illustrates the mapping of UE communications beams to cross-hatch pattern. The data symbol corresponding to the best TRBC may be used as a reference signal. As shown in FIG. 11B, modified SRS resource 1150 may be used to convey feedback from up to two additional RF chains and/or UEs.

The channel quality feedback of different subcarriers may also need to be conveyed to the TRP (even if the channel is very flat). The use of reference beams (the best TRBC), the channel quality feedback may be convey by:

Using the traditional SRS technique that involves the subcarrier of the transmission being the same subcarrier being measured. The bandwidth may also be configured in the same manner as the traditional SRS technique;
   Different subcarriers may be multiplexed in time, frequency, code space, or a combination thereof. However, because the resources of the SRS signals are generally limited in the time dimension, multiplexing in the code and/or frequency spaces may provide greater flexibility.

In a manner similar to TRP configuration of the UE with the modified uplink PRB , the TRP is able to configure the operation of the UE with the modified SRS resource. In a first illustrative example, the TRP configures the UE to perform explicit feedback using the modified SRS resource for a specified maximum number of UE and TRP communications beams with the UE being able to make the selection of both UE and TRP communications beams on its own. The selected TRP communications beams at the UE are signaled to the TRP using the PUCCH, for example. In a second illustrative example, the TRP configures the UE to perform feedback for a number of UE communications beams while the TRP communications beams are specified by the TRP. The UE is able to select its own UE communications beams. In a third illustrative example, the TRP configures the UE to perform feedback for a number of UE communications beams and a set of TRP communications beams with the UE being able to make the selection of both UE and TRP communications beams on its own, but the TRP communications beams are selected only from the configured set of TRP communications beams. The selected TRP communications beams are signaled to the TRP using the PUCCH, for example.

According to an example embodiment, the TRP provides configuration information to the UE. The TRP configures the operation of the UE by providing configuration information to the UE. The configuration information may be provided to the UE in a message, for example. Common configuration information is provided to the UE in deployments involving the use of either the two modified resources (i.e., modified uplink PRB or modified SRS resource).

As a first illustrative example, in a first configuration where the TRP configures the UE to perform feedback using either the modified SRS resource approach or the modified uplink PRB approach, for a specified number of UE and TRP communications beams with the UE being able to make the selection of both UE and TRP communications beams on its own, the TRP may provide to the UE the following configuration parameters:

TRP or UE specific parameters
      Number of symbols and/or subframes per different UE communications beam, and
      Number of symbols and/or subframes for different TRP communications beam.
   UE specific parameters
      An indicator of PUCCH resources for each UE, for the reporting of UE chosen TRP communications beam index(s).

As a second illustrative example, in a second configuration where the TRP configures the UE to perform feedback using either the modified SRS resource approach or the modified uplink PRB approach, for a number of UE communications beams while the TRP communications beams are specified by the TRP, the TRP may provide to the UE the following configuration parameters:

TRP or UE specific parameters
      Number of symbols and/or subframes per different UE communications beam, and
      Number of symbols and/or subframes for different TRP communications beam.
   UE specific parameters
      Indices for each of the TRP communications beams.

As a third illustrative example, in a third configuration where the TRP configures the UE to perform feedback using either the modified SRS resource approach or the modified uplink PRB approach, for a number of UE communications beams and a set of TRP communications beams with the UE being able to make the selection of both UE and TRP communications beams on its own, but the TRP communications beams are selected only from the assigned set of TRP communications beams, the TRP may provide to the UE the following configuration parameters:

TRP or UE specific parameters
      Number of symbols and/or subframes per different UE communications beam, and
      Number of symbols and/or subframes for different TRP communications beam.
   UE specific parameters
      Indices of TRP communications beams for the set of TRP communications beams, and
      An indicator of PUCCH resources for each UE, for UE reporting of the chosen TRP communications beam index(s).

In addition to the common configuration information as discussed above, additional configuration information may be provided by the TRP in the deployment using the modified SRS resource. The additional configuration information includes:

TRP specific SRS configuration
      Frequency comb spacing, e.g., 2, 4, and so on.
   UE specific configuration
      UE specific subcarrier offset for the first RF chain of the frequency comb,
      UE specific code sequence or cyclic shift,
      UE specific SRS subframe sounding time or time offset, and UE specific mapping of subcarriers in a situation when the configuration discussed in the second illustrative example is used.

The choice of the configuration parameters (as presented previously), as well as the value of each configuration parameter may be TRP specific or UE specific. The choice of the configuration may depend upon at least one of the following:

Available capacity in the downlink for signaling which TRP communications beam the UEs are to use, Available PUCCH capacity in the uplink for each UE to indicate its TRP communications beam choice, and UE and/or TRP capability.

Furthermore, the choice of configuration, along with the related configuration parameters, may be set statically, semi-statically, or dynamically.

Figures 12, 13:
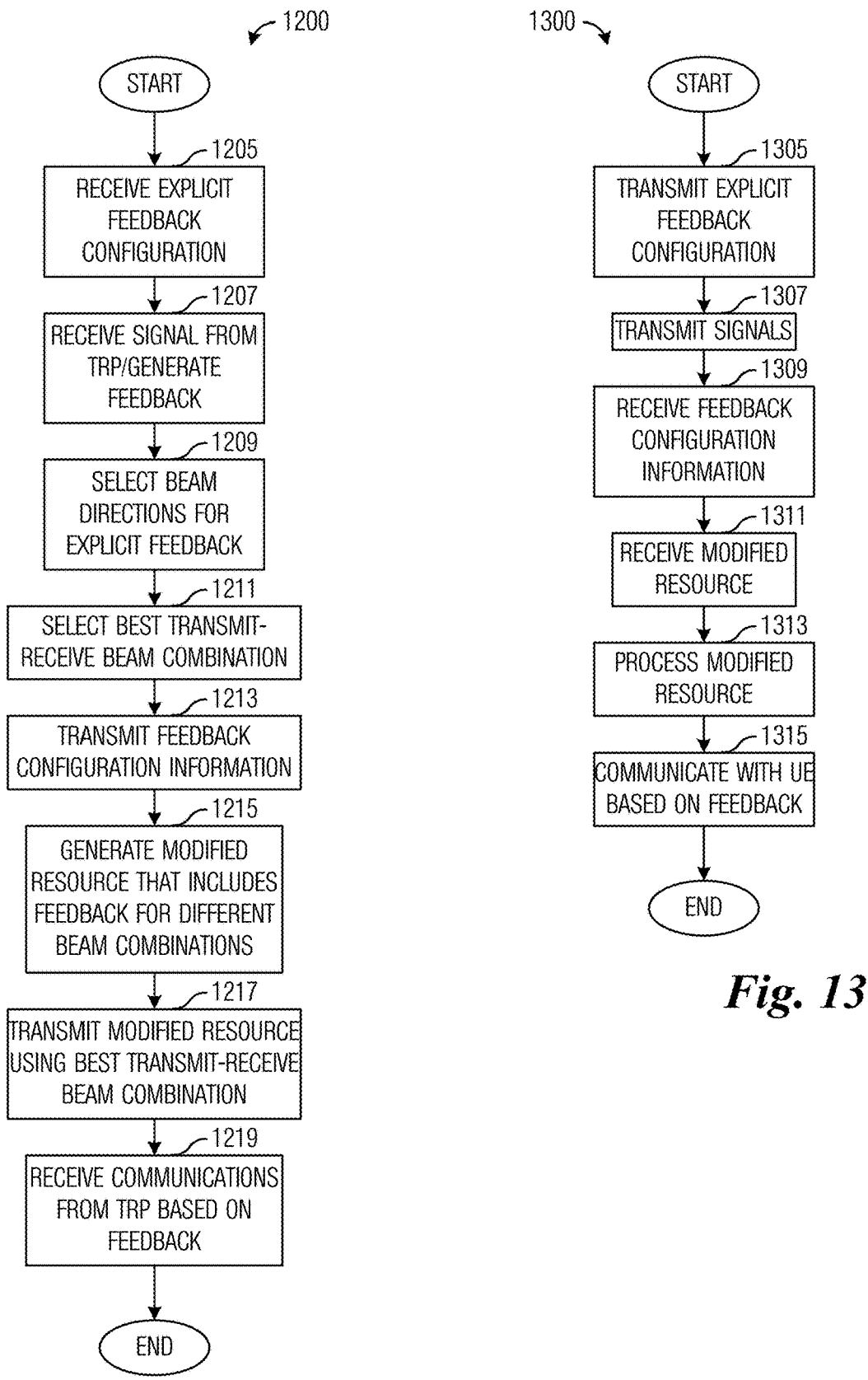
FIG. 12 illustrates a flow diagram of example operations occurring in a UE providing feedback to a TRP according to example embodiments described herein.
FIG. 13 illustrates a flow diagram of example operations occurring in a TRP communicating with a UE according to example embodiments described herein.

FIG. 12 illustrates a flow diagram of example operations 1200 occurring in a UE providing feedback to a TRP. Operations 1200 may be indicative of operations occurring in a UE as the UE provides feedback to a TRP. The UE uses explicit feedback to enable the transmission of explicit feedback associated with multiple TRBCs on a single TRBC.

Operations 1200 begin with the UE receiving explicit feedback configuration information (block 1205). The configuration information may include TRP and/or UE specific configuration parameters as discussed above to inform the UE how and when to report the feedback. The configuration information may be received from the TRP to which the UE will be reporting the feedback. Alternatively, the configuration information may be received from a network device (such as another TRP, a communications controller, a dedicated entity, and so forth) that configures feedback operation. The UE receives signals (e.g., reference signals) from the TRP and generates feedback in accordance with the received signals (block 1207). If the UE has information that provides relative position information regarding the location of the UE with respect to the TRP, the UE may be able to reduce a number of UE communications beams that the UE uses to receive the signals from the TRP. The information may be derived from previously received transmissions from the TRP, historical information, location information provided by the communications system, and so on. If the UE does not have any information to help locate the TRP, the UE may have to sweep through all of the UE communications beams while receiving signals from the TRP. The feedback generated from the received signals may include channel responses, channel quality indicators, channel state information, received signal strength indicators, SNRs, SINRs, and so forth.

The UE selects communications beam directions for explicit feedback (block 1209). Communications beams corresponding to the selected communications beam directions may be used to determine TRBCs for which the UE will report feedback. The UE selects UE communications beams, and potentially TRP communications beams, for explicit feedback. The UE selects one or more UE communications beams that were able to receive signals from TRP with received signal strengths (or some other indicator of channel quality) that exceed a threshold, for example. Depending upon the configuration, the UE may select TRP communications beams. As an example, in one configuration, the UE is able to select any of the TRP communications beams, while in another configuration, the UE is restricted to selecting TRP communications beams out of a set of TRP communications beams indicated to the UE. In yet another configuration, the UE is not allowed to select any TRP communications beams and the UE is informed by the TRP which TRP communications beams to report. The UE selects a best TRBC (block 1211). The UE may select the best TRBC in accordance with the feedback generated from the received signals. As an illustrative example, a TRBC with the best channel quality feedback, highest SNR, highest SINR, strongest received signal strength, and so on, is selected as the best TRBC.

In a situation where the UE is permitted to select TRP communications beams, the UE also transmits indications of the selected TRP communications beams (block 1213) which may for instance be transmitted using uplink control channel (i.e. PUCCH). The UE generates a modified resource including the explicit feedback for the different TRBCs (block 1215). The modified resource may be a modified uplink physical resource block (PRB) or a modified SRS resource, depending upon the configuration information received by the UE. The modified resource includes feedback for the best TRBC, as well as feedback for other TRBCs measured and generated by the UE from the received signals. The UE transmits the modified resource using the best transmit-received beam combination (block 1217). The UE receives communications from the TRP based on the feedback (block 1219).

In a first aspect, the present application provides a method for transmitting feedback. The method includes generating, by a user device, explicit channel feedback for a plurality of TRBCs between the user device and a TRP, generating, by the user device, a modified resource in accordance with explicit feedback configuration information, the modified resource configured to convey the explicit channel feedback, wherein an explicit channel feedback associated with each TRBC is conveyed on a different data symbol of the modified resource, and transmitting, by the user device, the modified resource to the TRP using a single TRBC.

According to a first embodiment of the method according to the first aspect, the modified resource is a modified SRS resource, and the explicit channel feedback associated with each TRBC is conveyed on a subset of subcarriers of a data symbol associated with the TRBC. According to a second embodiment of the method according to any preceding embodiment of the first aspect or the first aspect as such, the modified resource is a modified uplink PRB resource, and the explicit channel feedback associated with each TRBC is conveyed on a data symbol associated with the TRBC. According to a third embodiment of the method according to any preceding embodiment of the first aspect or the first aspect as such, when the user device includes a plurality of radio frequency (RF) chains, and the generating the modified resource includes placing explicit channel feedbacks associated with each RF chain on different subsets of subcarriers of the different data symbols of the modified resource. According to a fourth embodiment of the method according to any preceding embodiment of the first aspect or the first aspect as such, the single TRBC is a TRBC with a highest channel quality from the plurality of TRBCs.

According to a fifth embodiment of the method according to any preceding embodiment of the first aspect or the first aspect as such, the method also includes receiving the explicit feedback configuration information indicating at least a number of receive communications beams at the user device for which the user device is to generate explicit channel feedback. According to a sixth embodiment of the method according to any preceding embodiment of the first aspect or the first aspect as such, the explicit feedback configuration information further indicates one of a first set of transmit communications beams of the TRP for which the user device is able to selectively generate explicit channel feedback and a second set of transmit communications beams of the TRP from which the user device must generate channel feedback. According to a seventh embodiment of the method according to any preceding embodiment of the first aspect or the first aspect as such, the explicit feedback configuration information further indicates a first set of transmit communications beams of the TRP from which the user device is able to selectively generate channel feedback, and the method further includes transmitting, by the user device, an indicator of one or more transmit communications beams of the TRP selected by the user device.

FIG. 13 illustrates a flow diagram of example operations 1300 occurring in a TRP communicating with a UE. Operations 1300 may be indicative of operations occurring in a TRP as the TRP communicates with a UE. The communications between the TRP and the UE is in accordance with explicit feedback provided by the UE, which includes feedback with multiple TRBCs on a single TRBC.

Operations 1300 begin with the TRP transmitting explicit feedback configuration information to the UE (block 1305). The configuration information may include TRP and/or UE specific configuration parameters as discussed above to inform the UE how and when to report the feedback. In an alternative embodiment, the configuration information is transmitted by a network device (other than the TRP), which may be another TRP, a communications controller, a dedicated entity, and so forth, that configures the feedback operation. The TRP transmits signals (block 1307). The signals may be reference signals.

In a situation, where the UE is permitted to select TRP communications beams, the TRP receives feedback configuration information (block 1309). The feedback configuration information may include the TRP communications beams selected by the UE. The TRP receives a modified resource including feedback (block 1311). The modified resource may be a modified uplink PRB resource or a modified SRS resource, depending upon the configuration information. The modified resource is received on a single TRBC that is selected by the UE and/or TRP as a transmit-beam combination that is the best of available TRBCs. Although the modified resource is received on the best TRBC, the feedback included in the modified resource includes explicit channel feedback for multiple TRBCs. The TRP processes the modified resource (block 1313). The TRP processes the modified resource to obtain the feedback, for example. The feedback may include channel responses, channel quality indicators, channel state information, received signal strength indicators, SNRs, SINRs, and so forth. The TRP communicates with the UE based on the feedback (block 1315).

In a second aspect, the present application provides a method for operating a TRP. The method includes receiving, by the TRP, a modified resource over a single TRBC, the modified resource conveying explicit channel feedback associated with a plurality of TRBCs between the TRP and a user device, and communicating, by the TRP, with the user device in accordance with the explicit channel feedback.

According to a first embodiment of the method according to the second aspect, the single TRBC is a TRBC with a highest channel quality from the plurality of TRBCs. According to a second embodiment of the method according to any preceding embodiment of the first aspect or the first aspect as such, the method also includes transmitting, by the TRP, explicit feedback configuration information indicating at least a number of receive communications beams of the user device for which the user device is to generate explicit channel feedback. According to a third embodiment of the method according to any preceding embodiment of the first aspect or the first aspect as such, the explicit feedback configuration information further indicates one of a first set of transmit communications beams of the TRP from which the user device is able to selectively generate explicit channel feedback and a second set of transmit communications beams of the TRP from which the user device must generate explicit channel feedback. According to a fourth embodiment of the method according to any preceding embodiment of the first aspect or the first aspect as such, the explicit feedback configuration information further indicates a first set of transmit communications beams of the TRP from which the user device is able to selectively generate explicit channel feedback, the method further includes receiving, by the TRP, an indicator of transmit communications beams of the TRP selected by the user device.

Figure 14:
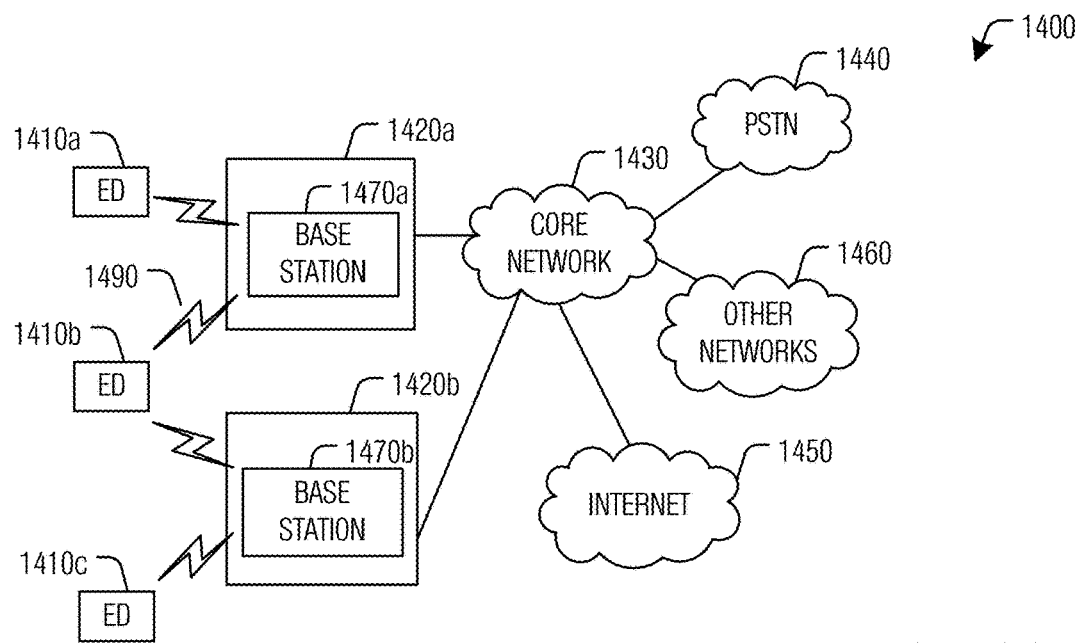
FIG. 14 illustrates an example communication system according to example embodiments described herein.

FIG. 14 illustrates an example communication system 1400. In general, the system 1400 enables multiple wireless or wired users to transmit and receive data and other content. The system 1400 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1200 includes electronic devices (ED) 1410a-1410c, radio access networks (RANs) 1420a-1420b, a core network 1430, a public switched telephone network (PSTN) 1440, the Internet 1450, and other networks 1460. While certain numbers of these components or elements are shown in FIG. 14, any number of these components or elements may be included in the system 1400.

The EDs 1410a-1410c are configured to operate and/or communicate in the system 1400. For example, the EDs 1410a-1410c are configured to transmit and/or receive via wireless or wired communication channels. Each ED 1410a-1410c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1420a-1420b here include base stations 1470a-1470b, respectively. Each base station 1470a-1470b is configured to wirelessly interface with one or more of the EDs 1410a-1410c to enable access to the core network 1430, the PSTN 1440, the Internet 1450, and/or the other networks 1460. For example, the base stations 1470a-1470b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1410a-1410c are configured to interface and communicate with the Internet 1450 and may access the core network 1430, the PSTN 1440, and/or the other networks 1460.

In the embodiment shown in FIG. 14, the base station 1470a forms part of the RAN 1420a, which may include other base stations, elements, and/or devices. Also, the base station 1470b forms part of the RAN 1420b, which may include other base stations, elements, and/or devices. Each base station 1470a-1470b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1470a-1470b communicate with one or more of the EDs 1410a-1410c over one or more air interfaces 1490 using wireless communication links. The air interfaces 1490 may utilize any suitable radio access technology.

It is contemplated that the system 1400 may use multiple channel access functionality, including such schemes as described above. In particular embodiments, the base stations and EDs implement LTE, LTE-A, LTE-B, or any future evolution (i.e., LTE-C or 5G). Of course, other multiple access schemes and wireless protocols may be utilized.

The RANs 1420a-1420b are in communication with the core network 1430 to provide the EDs 1410a-1410c with voice, data, application, Voice over Internet Protocol (VoIP), or other services. Understandably, the RANs 1420a-1420b and/or the core network 1430 may be in direct or indirect communication with one or more other RANs (not shown). The core network 1430 may also serve as a gateway access for other networks (such as the PSTN 1440, the Internet 1450, and the other networks 1460). In addition, some or all of the EDs 1410a-1410c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1450.

Although FIG. 14 illustrates one example of a communication system, various changes may be made to FIG. 14. For example, the communication system 1400 could include any number of EDs, base stations, networks, or other components in any suitable configuration.

Figure 15A:
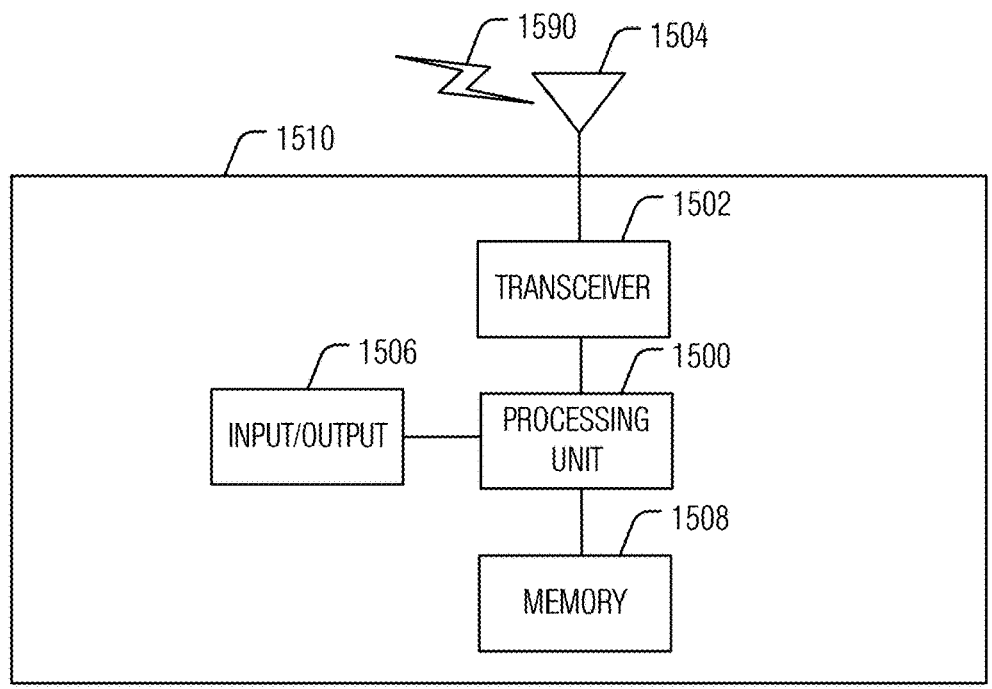
FIGS. 15A and 15B illustrate example devices that may implement the methods and teachings according to this disclosure.
Figure 15B:
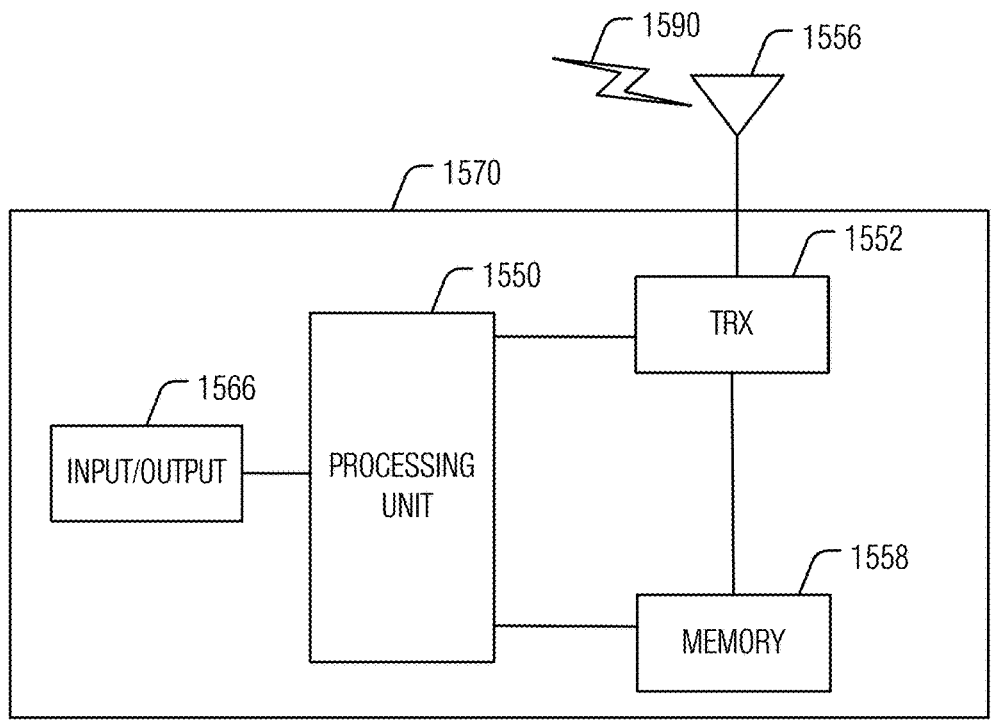

FIGS. 15A and 15B illustrate example devices that may implement the methods and teachings according to this disclosure. In particular, FIG. 15A illustrates an example ED 1510, and FIG. 15B illustrates an example base station 1570. These components could be used in the system 1400 or in any other suitable system.

As shown in FIG. 15A, the ED 1510 includes at least one processing unit 1500. The processing unit 1500 implements various processing operations of the ED 1510. For example, the processing unit 1500 could perform signal coding, data processing, power control, input/output processing, or any other functionality enabling the ED 1510 to operate in the system 1400. The processing unit 1500 also supports the methods and teachings described in more detail above. Each processing unit 1500 includes any suitable processing or computing device configured to perform one or more operations. Each processing unit 1500 could, for example, include a microprocessor, microcontroller, digital signal processor, field programmable gate array, or application specific integrated circuit.

The ED 1510 also includes at least one transceiver 1502. The transceiver 1502 is configured to modulate data or other content for transmission by at least one antenna or NIC (Network Interface Controller) 1504. The transceiver 1502 is also configured to demodulate data or other content received by the at least one antenna 1504. Each transceiver 1502 includes any suitable structure for generating signals for wireless or wired transmission and/or processing signals received wirelessly or by wire. Each antenna 1504 includes any suitable structure for transmitting and/or receiving wireless or wired signals. One or multiple transceivers 1502 could be used in the ED 1510, and one or multiple antennas 1504 could be used in the ED 1510. Although shown as a single functional unit, a transceiver 1502 could also be implemented using at least one transmitter and at least one separate receiver.

The ED 1510 further includes one or more input/output devices 1506 or interfaces (such as a wired interface to the Internet 1450). The input/output devices 1506 facilitate interaction with a user or other devices (network communications) in the network. Each input/output device 1506 includes any suitable structure for providing information to or receiving/providing information from a user, such as a speaker, microphone, keypad, keyboard, display, or touch screen, including network interface communications.

In addition, the ED 1510 includes at least one memory 1508. The memory 1508 stores instructions and data used, generated, or collected by the ED 1510. For example, the memory 1508 could store software or firmware instructions executed by the processing unit(s) 1500 and data used to reduce or eliminate interference in incoming signals. Each memory 1508 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 15B, the base station 1570 includes at least one processing unit 1550, at least one transceiver 1552, which includes functionality for a transmitter and a receiver, one or more antennas 1556, at least one memory 1558, and one or more input/output devices or interfaces 1566. A scheduler, which would be understood by one skilled in the art, is coupled to the processing unit 1550. The scheduler could be included within or operated separately from the base station 1570. The processing unit 1550 implements various processing operations of the base station 1570, such as signal coding, data processing, power control, input/output processing, or any other functionality. The processing unit 1550 can also support the methods and teachings described in more detail above. Each processing unit 1550 includes any suitable processing or computing device configured to perform one or more operations. Each processing unit 1550 could, for example, include a microprocessor, microcontroller, digital signal processor, field programmable gate array, or application specific integrated circuit.

Each transceiver 1552 includes any suitable structure for generating signals for wireless or wired transmission to one or more EDs or other devices. Each transceiver 1552 further includes any suitable structure for processing signals received wirelessly or by wire from one or more EDs or other devices. Although shown combined as a transceiver 1552, a transmitter and a receiver could be separate components. Each antenna 1556 includes any suitable structure for transmitting and/or receiving wireless or wired signals. While a common antenna 1556 is shown here as being coupled to the transceiver 1552, one or more antennas 1556 could be coupled to the transceiver(s) 1552, allowing separate antennas 1556 to be coupled to the transmitter and the receiver if equipped as separate components. Each memory 1558 includes any suitable volatile and/or non-volatile storage and retrieval device(s). Each input/output device 1566 facilitates interaction with a user or other devices (network communications) in the network. Each input/output device 1566 includes any suitable structure for providing information to or receiving/providing information from a user, including network interface communications.

Figure 16:
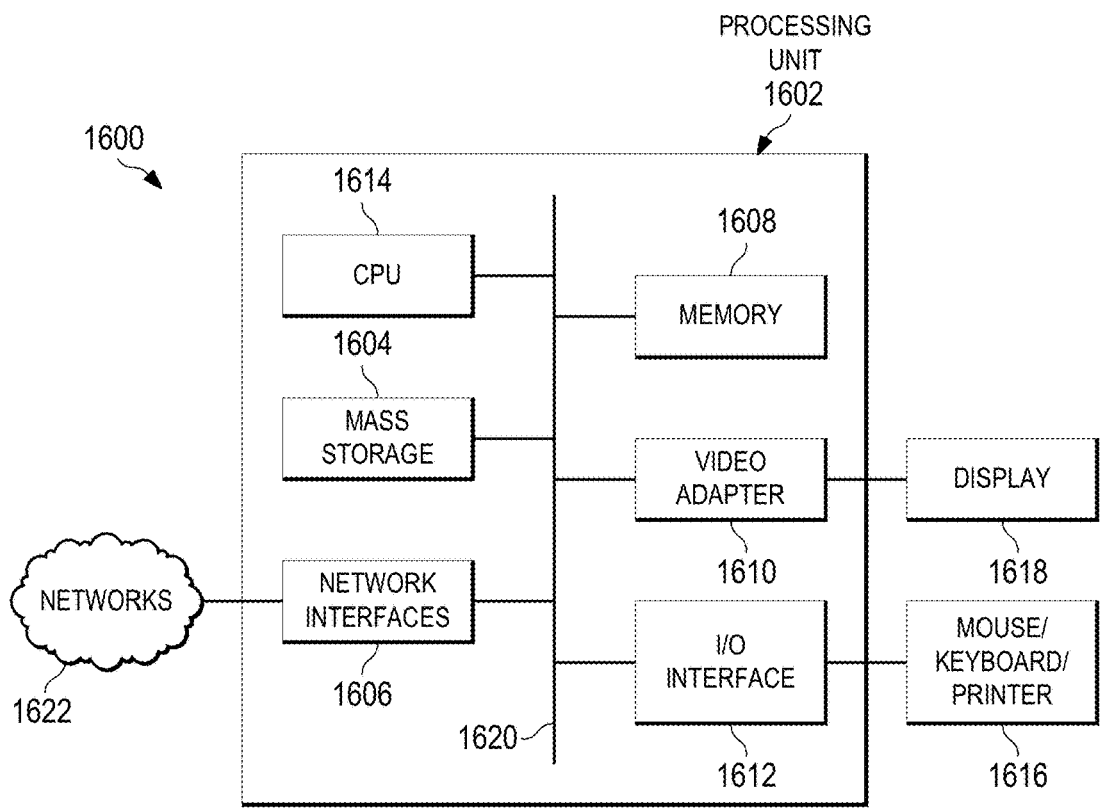
FIG. 16 is a block diagram of a computing system that may be used for implementing the devices and methods disclosed herein.

FIG. 16 is a block diagram of a computing system 1600 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1600 includes a processing unit 1602. The processing unit includes a central processing unit (CPU) 1614, memory 1608, and may further include a mass storage device 1604, a video adapter 1610, and an I/O interface 1612 connected to a bus 1620.

The bus 1620 may be one or more of any type of several bus architectures including a memory bus or memory controller, a peripheral bus, or a video bus. The CPU 1614 may comprise any type of electronic data processor. The memory 1608 may comprise any type of non-transitory system memory such as static random access memory (SRAM), dynamic random access memory (DRAM), synchronous DRAM (SDRAM), read-only memory (ROM), or a combination thereof. In an embodiment, the memory 1608 may include ROM for use at boot-up, and DRAM for program and data storage for use while executing programs.

The mass storage 1604 may comprise any type of non-transitory storage device configured to store data, programs, and other information and to make the data, programs, and other information accessible via the bus 1620. The mass storage 1604 may comprise, for example, one or more of a solid state drive, hard disk drive, a magnetic disk drive, or an optical disk drive.

The video adapter 1610 and the I/O interface 1612 provide interfaces to couple external input and output devices to the processing unit 1602. As illustrated, examples of input and output devices include a display 1618 coupled to the video adapter 1610 and a mouse/keyboard/printer 1616 coupled to the I/O interface 1612. Other devices may be coupled to the processing unit 1602, and additional or fewer interface cards may be utilized. For example, a serial interface such as Universal Serial Bus (USB) (not shown) may be used to provide an interface for an external device.

The processing unit 1602 also includes one or more network interfaces 1606, which may comprise wired links, such as an Ethernet cable, and/or wireless links to access nodes or different networks. The network interfaces 1606 allow the processing unit 1602 to communicate with remote units via the networks. For example, the network interfaces 1606 may provide wireless communication via one or more transmitters/transmit antennas and one or more receivers/receive antennas. In an embodiment, the processing unit 1602 is coupled to a local-area network 1622 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a placing unit/module, and/or a communication unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for transmitting feedback, the method comprising:
generating, by a user device, an explicit channel feedback including multiple explicit downlink channel feedbacks each of which having a distinct complex downlink channel response for a different one of a plurality of transmit beam-receive beam combinations (TRBCs) between a transmit-receive point (TRP) and the user device, the explicit channel feedback representing a complex downlink channel response, each TRBC in the plurality of TRBCs corresponding to a user device transmit communications beam and a TRP receive communications beam;
generating, by the user device, a modified resource in accordance with an explicit feedback configuration information, the modified resource conveying the explicit channel feedback, each of the multiple explicit downlink channel feedbacks, in the explicit channel feedback, being conveyed on a different data symbol of the modified resource; and
transmitting, by the user device, the modified resource to the TRP using a single TRBC.

2. The method of claim 1, wherein the modified resource is a modified sounding reference signal (SRS) resource, and wherein each of the multiple explicit downlink channel feedbacks are conveyed on a different subset of subcarriers.

3. The method of claim 1, wherein the modified resource is a modified uplink physical resource block (PRB) resource.

4. The method of claim 1, wherein the user device comprises a plurality of radio frequency (RF) chains, and wherein each of the multiple explicit downlink channel feedbacks are associated-with a different RF chain in the plurality of RF chains of the user device.

5. The method of claim 1, wherein the single TRBC is a TRBC with a highest channel quality from the plurality of TRBCs.

6. The method of claim 1, further comprising receiving the explicit feedback configuration information indicating at least a number of receive communications beams at the user device for which the user device is to generate the explicit channel feedback.

7. The method of claim 6, wherein the explicit feedback configuration information further indicates one of a first set of transmit communications beams of the TRP for which the user device is able to selectively generate a first corresponding channel feedback and a second set of transmit communications beams of the TRP from which the user device must generate a second corresponding channel feedback.

8. The method of claim 6, wherein the explicit feedback configuration information further indicates a first set of transmit communications beams of the TRP from which the user device is able to selectively generate the explicit channel feedback, and wherein the method further comprises transmitting, by the user device, an indicator of one or more transmit communications beams of the TRP selected by the user device.

9. A method for operating a transmit-receive point (TRP), the method comprising:
receiving, by the TRP, a modified resource over a single transmit beam-receive beam combination (TRBC) between the TRP and a user device, the modified resource conveying an explicit channel feedback including multiple explicit downlink channel feedbacks each of which having a distinct complex downlink channel response for a different one of a plurality of transmit beam-receive beam combinations (TRBCs) between a transmit-receive point (TRP) and the user device, the explicit channel feedback representing a complex downlink channel response, each TRBC in the plurality of TRBCs corresponding to a user device transmit communications beam and a TRP receive communications beam, each of the multiple explicit downlink channel feedbacks, in the explicit channel feedback, being conveyed on a different data symbol of the modified resource; and communicating, by the TRP, with the user device in accordance with the explicit channel feedback.

10. The method of claim 9, wherein the single TRBC is a TRBC with a highest channel quality from the plurality of TRBCs.

11. The method of claim 9, further comprising transmitting, by the TRP, explicit feedback configuration information indicating at least a number of receive communications beams of the user device for which the user device is to generate the explicit channel feedback.

12. The method of claim 11, wherein the explicit feedback configuration information further indicates one of a first set of transmit communications beams of the TRP from which the user device is able to selectively generate a first corresponding channel feedback and a second set of transmit communications beams of the TRP from which the user device must generate a second corresponding channel feedback.

13. The method of claim 11, wherein the explicit feedback configuration information further indicates a first set of transmit communications beams of the TRP from which the user device is able to selectively generate the explicit channel feedback, and wherein the method further comprises receiving, by the TRP, an indicator of transmit communications beams of the TRP selected by the user device.

14. The method of claim 9, wherein the modified resource is a modified sounding reference signal (SRS) resource, and wherein each of the multiple explicit downlink channel feedbacks are conveyed on a different subset of subcarriers.

15. The method of claim 9, wherein the modified resource is a modified uplink physical resource block (PRB) resource.

16. The method of claim 9, wherein the user device comprises a plurality of radio frequency (RF) chains, and wherein each of the multiple explicit downlink channel feedbacks are associated with a different RF chain in the plurality of RF chains of the user device.

17. A user device adapted to transmit feedback, the user device comprising:
a non-transitory memory storage comprising instructions; and
a processor in communication with the non-transitory memory storage, wherein the processor executes the instructions to:
generate an explicit channel feedback including multiple explicit downlink channel feedbacks each of which having a distinct complex downlink channel response for a different one of a plurality of transmit beam-receive beam combinations (TRBCs) between the user device and a transmit-receive point (TRP), the explicit channel feedback being a representation of a complex downlink channel response, each TRBC in the plurality of TRBCs corresponding to a user device transmit communication beam and a TRP receive communication beam;
generate a modified resource in accordance with an explicit feedback configuration information, the modified resource conveying the explicit channel feedback, each of the multiple explicit downlink channel feedbacks, in the explicit channel feedback, being conveyed on a different data symbol of the modified resource; and
transmit the modified resource to the TRP using a single TRBC.

18. The user device of claim 17, wherein the modified resource is a modified sounding reference signal (SRS) resource, and wherein each of the multiple explicit downlink channel feedbacks are conveyed on a different subset of subcarriers.

19. The user device of claim 17, wherein the modified resource is a modified uplink physical resource block (PRB).

20. The user device of claim 17, wherein the user device comprises a plurality of radio frequency (RF) chains, and wherein each of the multiple explicit downlink channel feedbacks are associated with a different RF chain in the plurality of RF chains of the user device.

21. The user device of claim 17, wherein the processor executes the instructions to receive the explicit feedback configuration information indicating at least a number of receive communications beams at the user device for which the user device is to generate the explicit channel feedback.

22. The user device of claim 21, wherein the explicit feedback configuration information further indicates a first set of transmit communications beams of the TRP from which the user device is able to selectively generate the explicit channel feedback, and wherein the processor executes the instructions to transmit an indicator of one or more transmit communications beams of the TRP selected by the user device.

23. A transmit-receive point (TRP) comprising:
a non-transitory memory storage comprising instructions; and
a processor in communication with the non-transitory memory storage, wherein the processor executes the instructions to :
receive a modified resource over a single transmit beam-receive beam combination (TRBC) between the TRP and a user device, the modified resource conveying an explicit channel feedback including multiple explicit downlink channel feedbacks each of which having a distinct complex downlink channel response for a different one of a plurality of transmit beam-receive beam combinations (TRBCs) between a transmit-receive point (TRP) and the user device, the explicit channel feedback representing a complex downlink channel response, each TRBC in the plurality of TRBCs corresponding to a user device transmit communications beam and a TRP receive communications beam, each of the multiple explicit downlink channel feedbacks, in the explicit channel feedback, being conveyed on a different data symbol of the modified resource; and
communicate with the user device in accordance with the explicit channel feedback.

24. The TRP of claim 23, wherein the processor further executes the instructions to transmit explicit feedback configuration information indicating at least a number of receive communications beams of the user device for which the user device is to generate the explicit channel feedback.

25. The TRP of claim 24, wherein the explicit feedback configuration information further indicates a first set of transmit communications beams of the TRP from which the user device is able to selectively generate the explicit channel feedback, and wherein the processor further executes the instructions to receive an indicator of transmit communications beams of the TRP selected by the user device.

26. The TRP of claim 24, wherein the modified resource is a modified sounding reference signal (SRS) resource, and wherein each of the multiple explicit downlink channel feedbacks are conveyed on a different subset of subcarriers.

27. The TRP of claim 24, wherein the modified resource is a modified uplink physical resource block (PRB) resource.

28. The TRP of claim 24, wherein the user device comprises a plurality of radio frequency (RF) chains, and wherein each of the multiple explicit downlink channel feedbacks are associated with a different RF chain in the plurality of RF chains of the user device.

* * * * *